United States Patent
Shorb et al.

(10) Patent No.: US 10,459,849 B1
(45) Date of Patent: Oct. 29, 2019

(54) SCHEDULING OPERATIONS IN AN ACCESS-CONTROLLED REGION OF MEMORY

(71) Applicant: SAS Institute Inc., Cary, NC (US)

(72) Inventors: Charles S. Shorb, Cary, NC (US); James P. Carroll, Cary, NC (US)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 16/223,906

(22) Filed: Dec. 18, 2018

Related U.S. Application Data

(60) Provisional application No. 62/725,292, filed on Aug. 31, 2018.

(51) Int. Cl.
*G06F 12/00* (2006.01)
*G06F 12/14* (2006.01)
(Continued)

(52) U.S. Cl.
CPC .......... *G06F 12/1441* (2013.01); *G06F 3/065* (2013.01); *G06F 3/0622* (2013.01); *G06F 3/0631* (2013.01); *G06F 3/0659* (2013.01); *G06F 3/0679* (2013.01); *G06F 9/4881* (2013.01); *G06F 9/5016* (2013.01);
(Continued)

(58) Field of Classification Search
CPC .. G06F 12/1441; G06F 3/0622; G06F 3/0631; G06F 3/065; G06F 3/0659; G06F 3/0679; G06F 9/4881; G06F 9/5016; G06F 9/526; G06F 11/3034; G06F 11/3409; G06F 12/0246; G06F 2201/88
See application file for complete search history.

(56) References Cited

U.S. PATENT DOCUMENTS 8,695,003 B2 * 4/2014 Laksberg .............. G06F 9/4881
  711/153
8,904,068 B2  12/2014 Durant et al.
(Continued)

OTHER PUBLICATIONS

Bernstein, P. et al.. "4. Locking: Methods, algorithms, implementation . . . ", Lecture material, Stanford DD group, Freie Universität Berlin, Jan. 1, 2010, pp. 1-68, obtained on Feb. 7, 2019, obtained from internet: http://www.inf.fu-berlin.de/lehre/SS10/DBS-TA/folien/04-10-TA-Sync-1.pdf.

(Continued)

*Primary Examiner* — Prasith Thammavong
(74) *Attorney, Agent, or Firm* — Coats & Bennett, PLLC

(57) ABSTRACT

A computing device receives, at a scheduler of the computing device, a first write request from a first thread of a plurality of threads. The scheduler schedules access for the plurality of threads across a boundary of an access-controlled region in a memory of the computing device. The computing device determines that a second memory region in the access-controlled region is allocated for storing data copied from a first memory region. During copying, to the second memory region, the data copied from the first memory region, the computing device permits scheduling, by the scheduler, an operation to read from the first memory region for any read requests from the plurality of threads during the copying; and denies scheduling, by the scheduler, an operation to write to the first memory region for any subsequent write requests from the plurality of threads during the copying.

30 Claims, 24 Drawing Sheets

(51) Int. Cl.
*G06F 3/06* (2006.01)
*G06F 9/48* (2006.01)
*G06F 9/50* (2006.01)
*G06F 9/52* (2006.01)
*G06F 11/34* (2006.01)
*G06F 11/30* (2006.01)
*G06F 12/02* (2006.01)

(52) U.S. Cl.
CPC .......... *G06F 9/5022* (2013.01); *G06F 9/526* (2013.01); *G06F 11/3034* (2013.01); *G06F 11/3409* (2013.01); *G06F 12/0246* (2013.01); *G06F 2201/88* (2013.01)

(56) References Cited

U.S. PATENT DOCUMENTS

| | | | |
|---|---|---|---|
| 9,990,187 B1 | 6/2018 | Carroll et al. | |
| 10,083,199 B1* | 9/2018 | Sharma | G06F 3/0619 |
| 2005/0278492 A1* | 12/2005 | Stakutis | G06F 11/2082 711/161 |
| 2009/0300306 A1* | 12/2009 | Satou | G06F 3/061 711/162 |
| 2011/0252211 A1* | 10/2011 | Moudgill | G06F 13/28 711/165 |
| 2013/0007292 A1* | 1/2013 | Reed | G06F 3/0617 709/228 |
| 2013/0054520 A1* | 2/2013 | Sampathkumar | G06F 3/0617 707/610 |
| 2013/0097457 A1* | 4/2013 | Drucker | G06F 11/20 714/4.11 |
| 2014/0337848 A1 | 11/2014 | Llamas et al. | |
| 2015/0067282 A1* | 3/2015 | Kobayashi | G06F 3/0619 711/158 |
| 2016/0041779 A1* | 2/2016 | Kanai | G06F 3/0619 711/162 |
| 2016/0078088 A1* | 3/2016 | Venkatesh | G06F 16/24539 707/713 |

OTHER PUBLICATIONS

Unknown, "Concurrency Control Algorithms", Mar. 12, 2015, pp. 1-7, Lecture notes, Iowa State University Department of Computer Science, obtained on Feb. 7, 2019, obtained from internet: web.cs.iastate.edu/~cs554/Notes/Ch6-ConcurrecyControl.pdf.

Scherer, B. et al., "Mutual Exclusion: Classical Algorithms for Locks", Comp 422 Lecture, Mar. 20, 2008, pp. 1-59, Department of Computer Science, Rice University, US.

Geeksforgeeks, "DBMS Concurrency Control Protocol Two Phase Locking (2-PL)-I", online article, obtained on Sep. 25, 2018, obtained from internet: https://www.geeksforgeeks.org/dbms-concurrency-control-protocols-two-phase-locking-2-pl/.

Gamper, J., "Chapter 9: Concurrency Control". Concurrency-Distributed Database-Lecture 09, May 21, 2009, pp. 1-34, Free University of Bolzano Databases, Information Technology, obtained on Feb. 7, 2019, obtained from internet: http://www.inf.unibz.it/dis/teaching/DDB/In/ddb09.pdf.

Tutorialspoint, "Distributed DBMS—Controlling Concurrency", online article, obtained on Sep. 25, 2018, pp. 1-6, Oobtained from internet: https://www.tutorialspoint.com/distributed_dbms/distributed_dbms_controlling_concurrency.htm.

Redis, "Distributed locks with Redis", online article, obtained on Sep. 25, 2018, obtained from internet: https://redis.io/topics/distlock.

Zimmer, A, "Locking Algorithm with Premature Unlocks", Jan. 1, 1992, pp. 1-11, obtained on Sep. 27, 2018, obtained from: http://citeseerx.ist.psu.edu/viewdoc/summary;jsessionid=CCB303AF41735E37A0C8CAA299B86313?doi=10.1.1.54.6124.

Kleppmann, M. "How to do distributed locking", online blog, published on Feb. 8, 2016, pp. 1-20, obtained on Sep. 25, 2018, obtained from internet: https://martin.kleppmann.com/2016/02/08/how-to-do-distributed-locking.html.

Kimura, H. et al., "Efficient Locking Techniques for Databases on Modern Hardware", The Third International Workshop on Accelerating Data Management Systems using Modern Processor and Storage Architectures, Jan. 1, 2012, pp. 1-12, obtained from internet: www.adms-conf.org/kimura_adms12.pdf.

Langdale, G. et al., "Lock-Free Programming", Apr. 8, 2005, pp. 1-29, lecture material, Carnegie Mellon University, School of Computer Science, obtained on Feb. 7, 2019, obtained from internet: https://www.cs.cmu.edu/~410-s05/lectures/L31_LockFree.pdf.

Pizlo, F., "Locking in Webkit", online article, May 6, 2016, pp. 1-47, obtained on Sep. 25, 2018, obtained from Internet https://webkit.org/blog/6161/locking-in-webkit/.

Gohil, J. et al., "Design, Implementation and Performance Analysis of Concurrency Control Algorithm With Architecture for Temporal Database", International Journal of Database Management Systems ( IJDMS ), Oct. 1, 2016, pp. 25-38, vol. 8, No. 5, obtained from internet: aircconline.com/ijdms/V8N5/8516ijdms03.pdf.

Yun, H. et al., "NOMAD: Nonlocking, stOchastic Multimachine algorithm for Asynchronous and Decentralized matrix completion", Proceedings of the VLDB Endowment VLDB Endowment, vol. 7 Issue 11, Jul. 1, 2014, pp. 975-986, obtained from internet: www.vldb.org/pvldb/vol7/p975-yun.pdf.

Raphael, M., "RFC: Smart locking algorithm for better concurrency #329", online discussion, Nov. 22, 2016, pp. 1-4, obtained on Sep. 25, 2018, obtained from internet: https://github.com/pretix/pretix/issues/329.

Wikipedia, "Spinlock", online article, pp. 1-4, obtained on Dec. 9, 2018, obtained from internet: https://en.wikipedia.org/wiki/Spinlock.

Bovet, D. et al. "Spin Locks", in Understanding the Linux Kernel, 2nd Edition, Dec. 1, 2002, pp. 167-172, O'Reilly, US.

\* cited by examiner

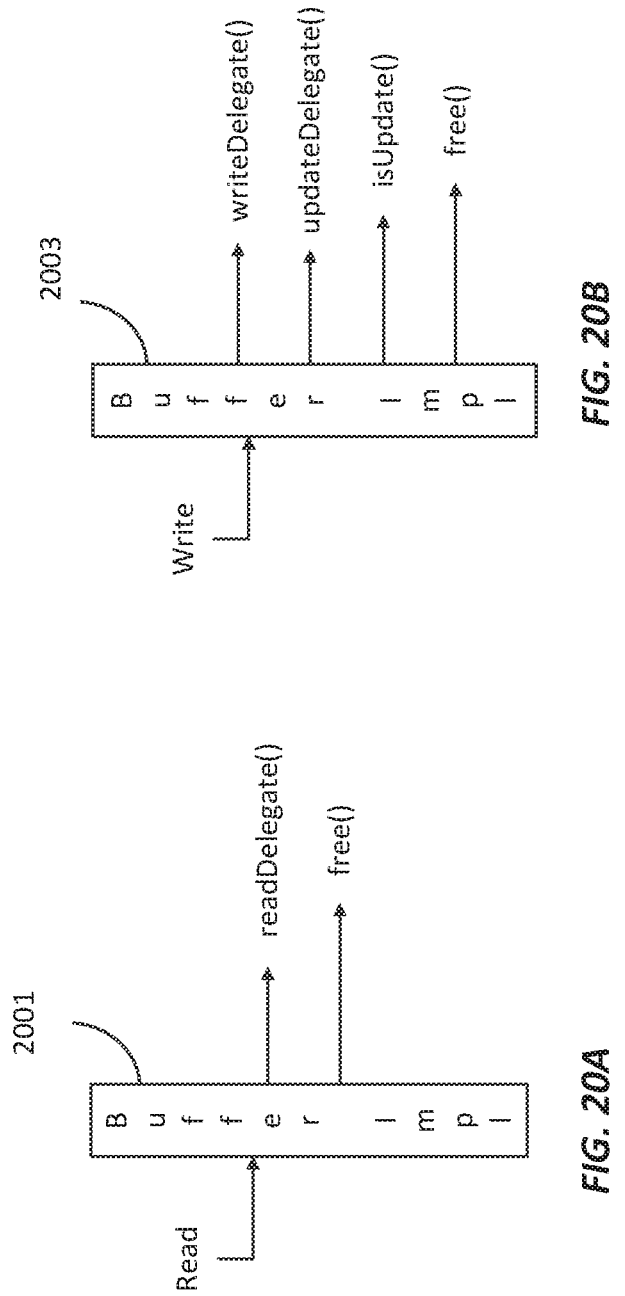

SCHEDULING OPERATIONS IN AN ACCESS-CONTROLLED REGION OF MEMORY

RELATED APPLICATIONS

This application is a U.S. Utility Application which claims the benefit of U.S. Provisional Application No. 62/725,292, filed Aug. 31, 2018, the disclosure of which is incorporated herein by reference in its entirety.

BACKGROUND

Computing devices have a shared memory region in a critical section or region for access by multiple processes or threads. A thread represents or otherwise identifies a series of one or more operations on the shared memory region according to programed instructions of a process. For instance, a thread could require access to the critical section for writing data to a memory element in the critical section. Sometimes an operating system will allocate within the critical section a new shared memory region and copy data from an old shared memory region to the new shared memory region. In order to protect the integrity of the data in the critical section during copying, an operating system of a computing device will lock the entire critical section from access for operations on the old memory region.

SUMMARY

In an example embodiment, a computer-program product tangibly embodied in a non-transitory machine-readable storage medium is provided. The computer-program product includes instructions to cause a computing device to receive, at a scheduler of the computing device, a first write request from a first thread of a plurality of threads. The scheduler schedules access for the plurality of threads across a boundary of an access-controlled region in a memory of the computing device. The access-controlled region comprises a first memory region. Each of the plurality of threads indicates an operation on the first memory region. The first write request indicates that a first operation associated with the first thread comprises an operation to add, remove, or update data of a memory element of the first memory region. The computing device determines that a second memory region in the access-controlled region is allocated for storing data copied from the first memory region. During copying, to the second memory region, the data copied from the first memory region, the computing device permits scheduling, by the scheduler, an operation to read from the first memory region for any read requests from the plurality of threads during the copying; and denies scheduling, by the scheduler, an operation to write to the first memory region for any subsequent write requests from the plurality of threads during the copying. When data of the second memory region comprises a copy of the data copied from the first memory region, the computing device permits scheduling, by the scheduler, an operation to write to the second memory region for a second write request of the subsequent write requests.

In other example embodiments, one or more computing devices and methods are provided herein.

Other features and aspects of example embodiments are presented below in the Detailed Description when read in connection with the drawings presented with this application.

BRIEF DESCRIPTION OF THE DRAWINGS

FIGS. 20A-20B illustrates an example of a buffer implementation in at least one embodiment.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
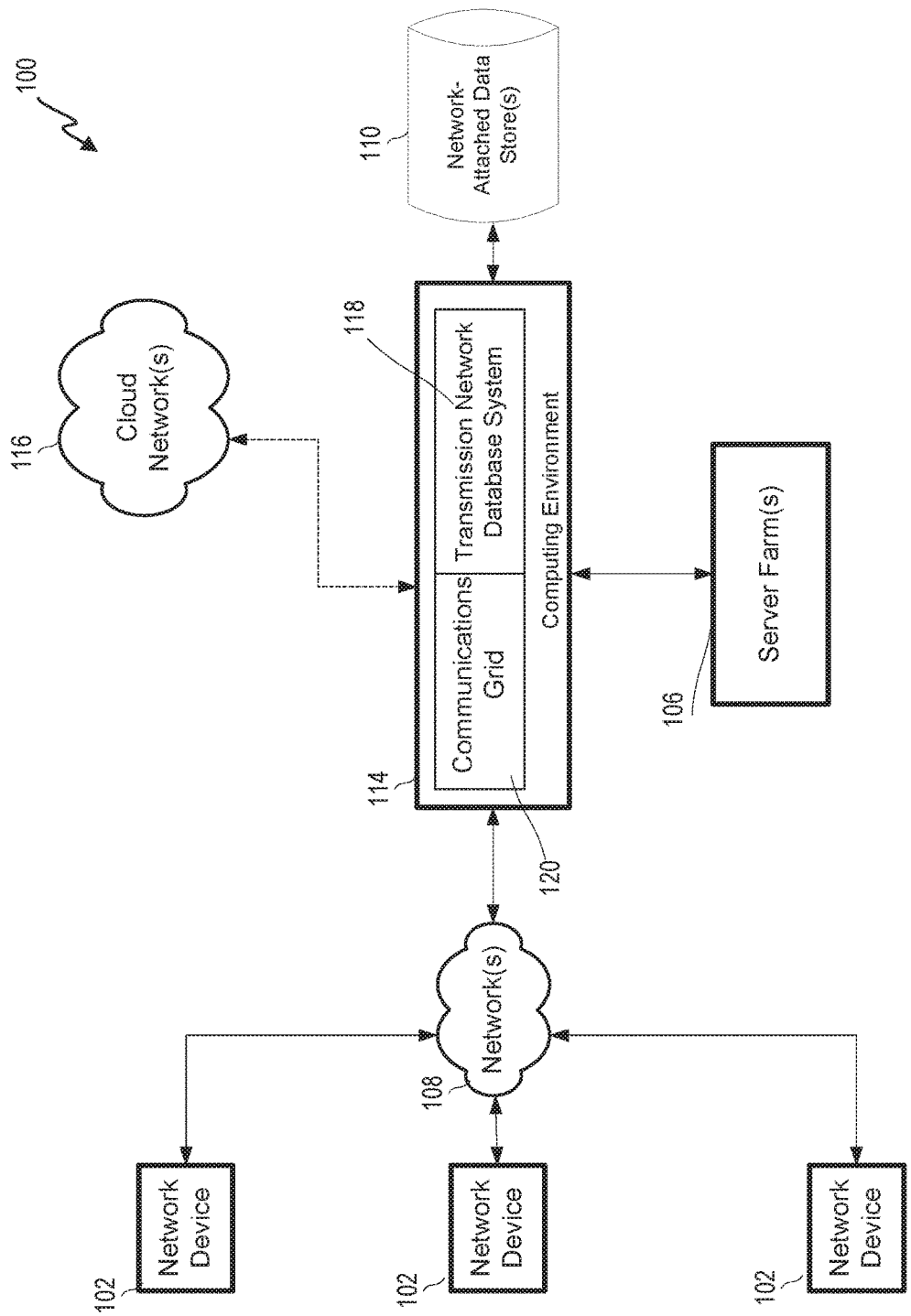
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
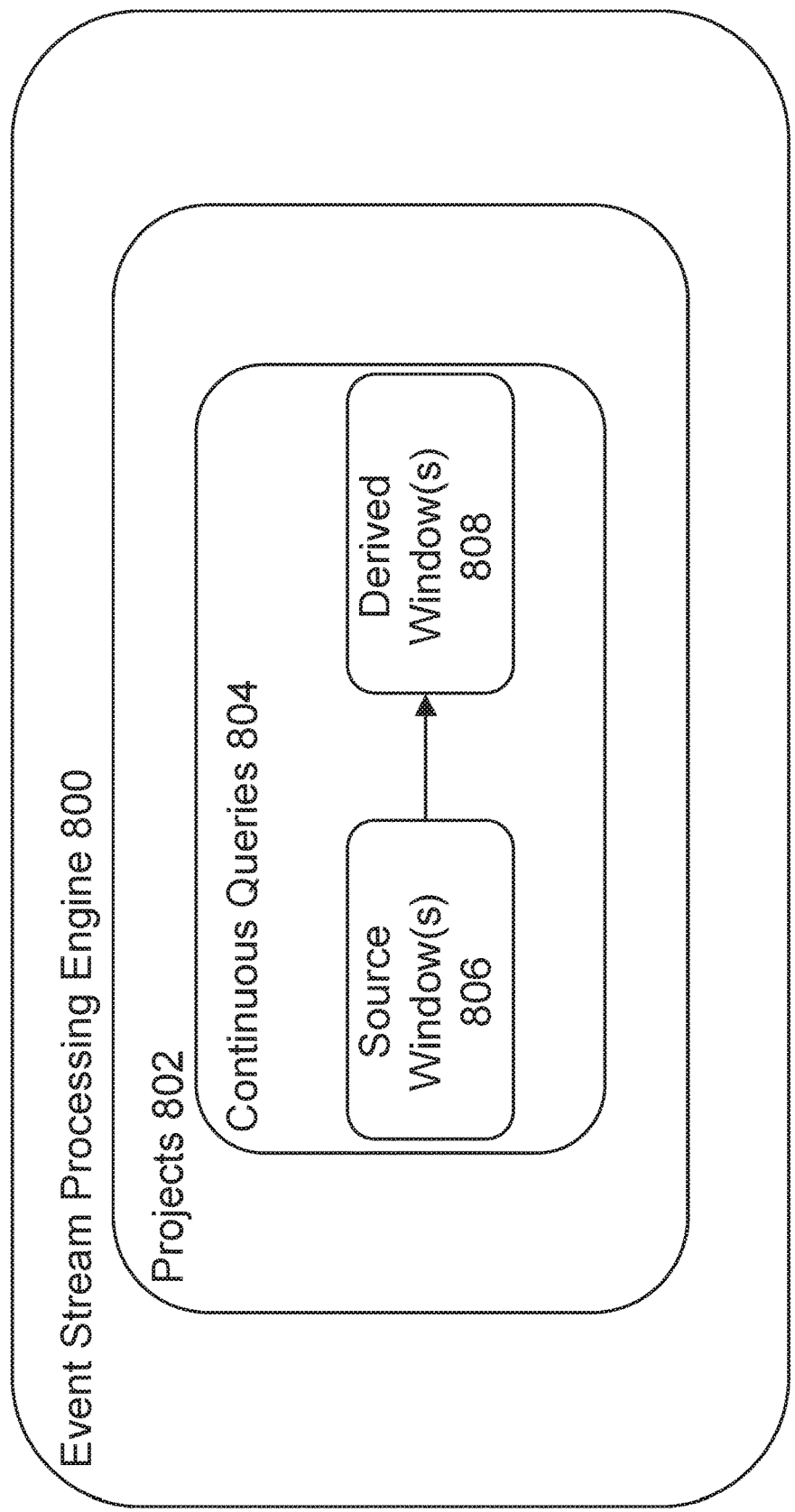
FIG. 8 illustrates a block diagram including components of an Event Stream Processing Engine (ESPE), according to at least one embodiment of the present technology.
Figure 9:
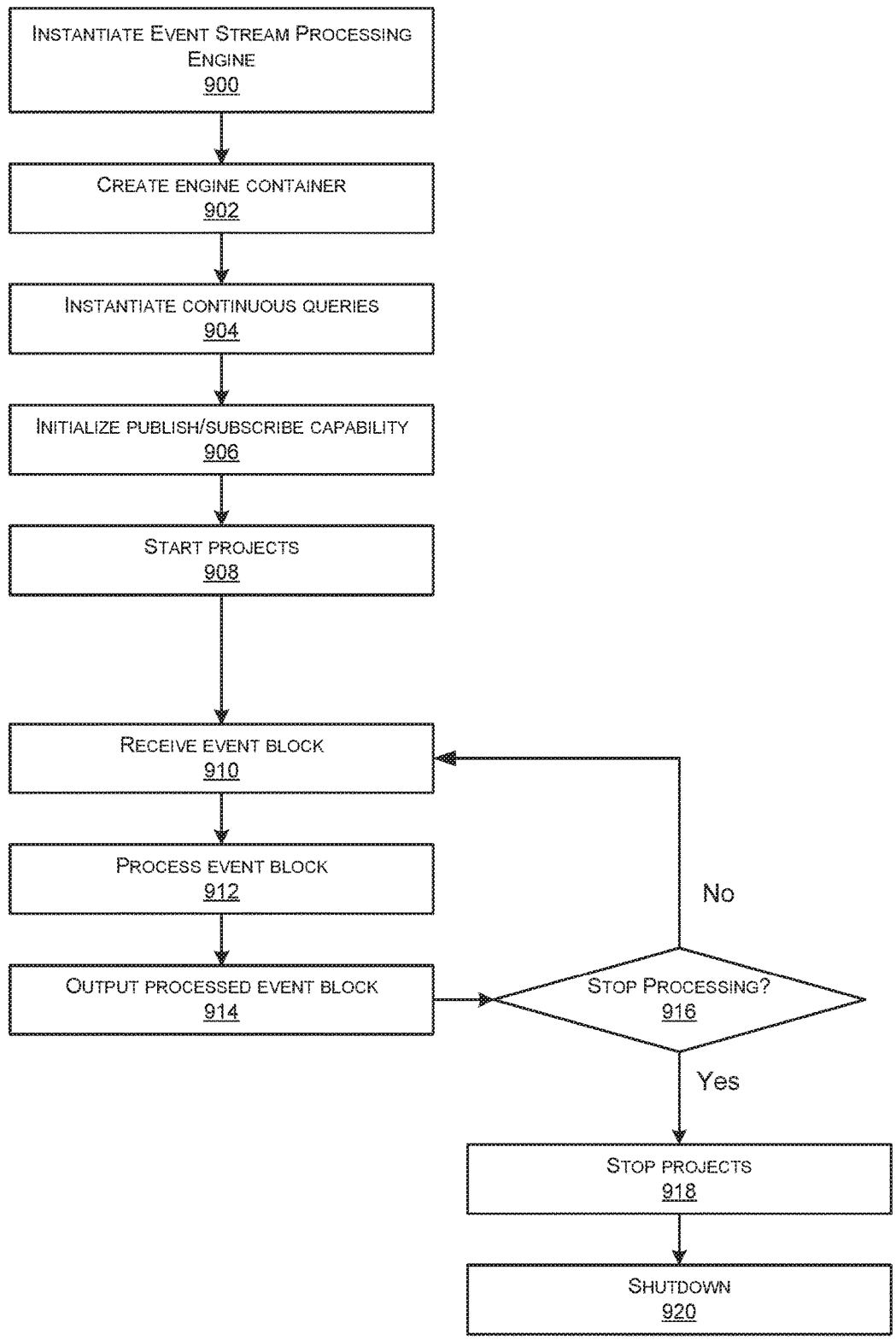
FIG. 9 illustrates a flow chart showing an example process including operations performed by an event stream processing engine, according to at least one embodiment of the present technology.
Figure 10:
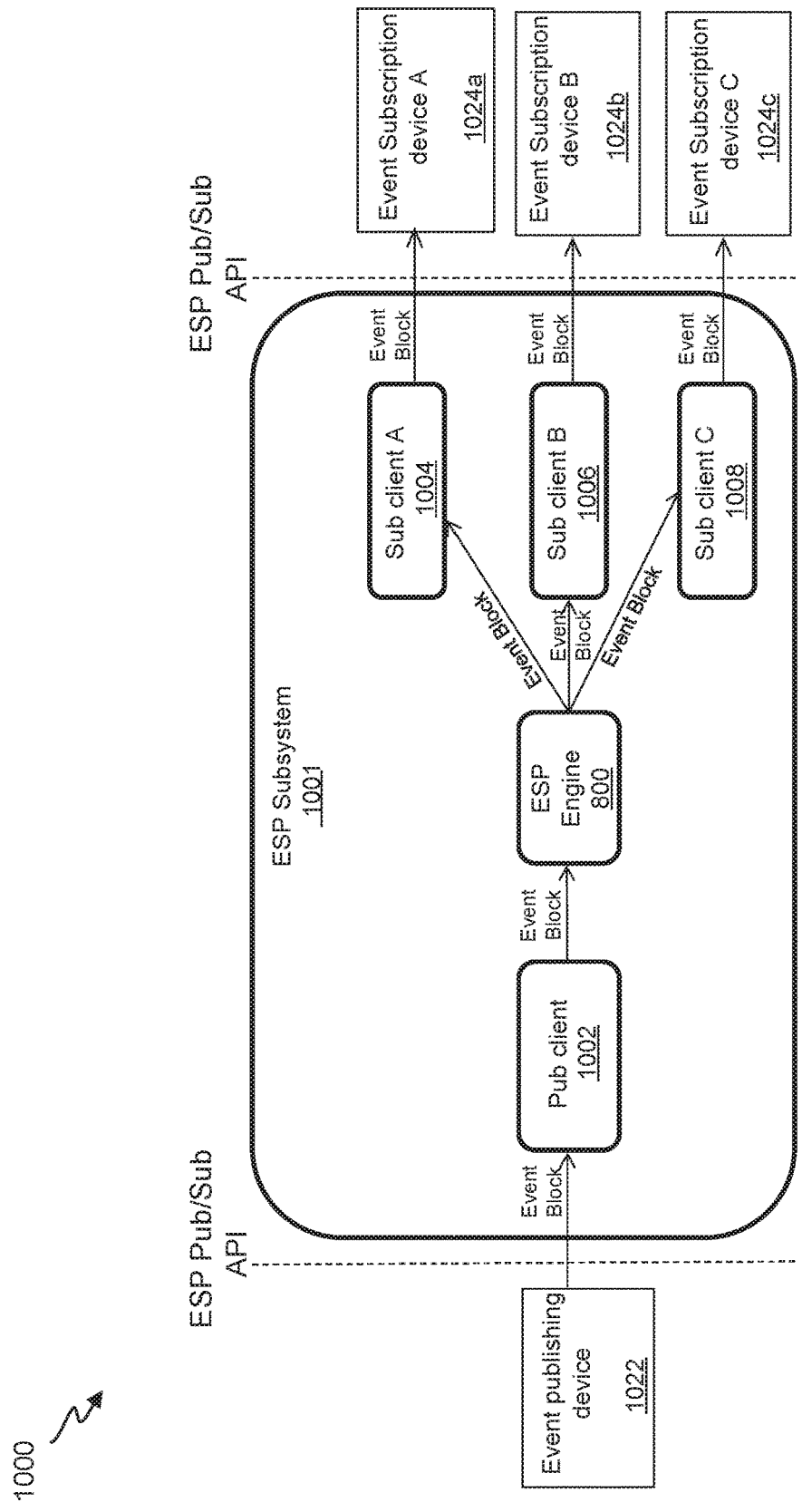
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
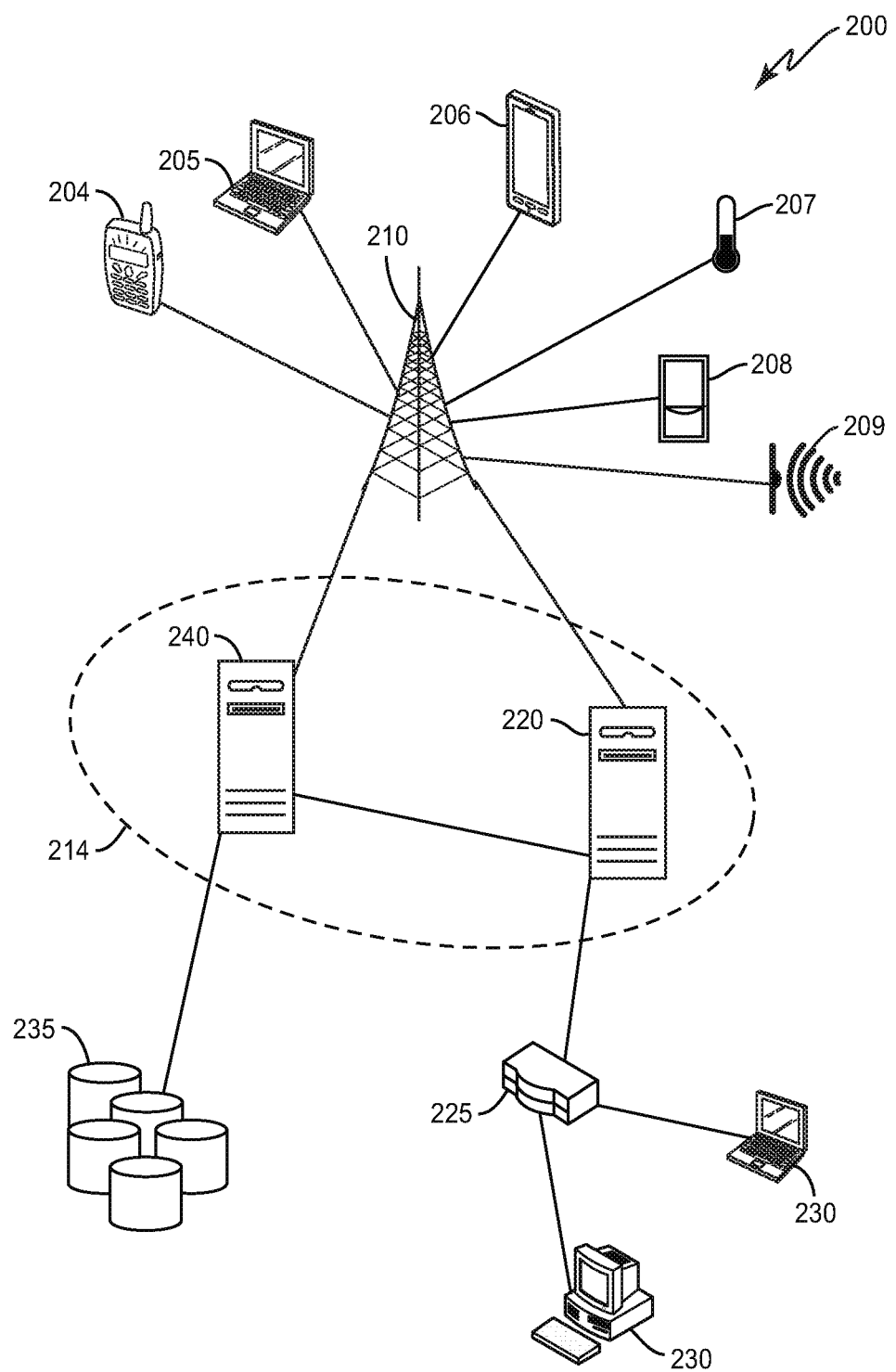
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
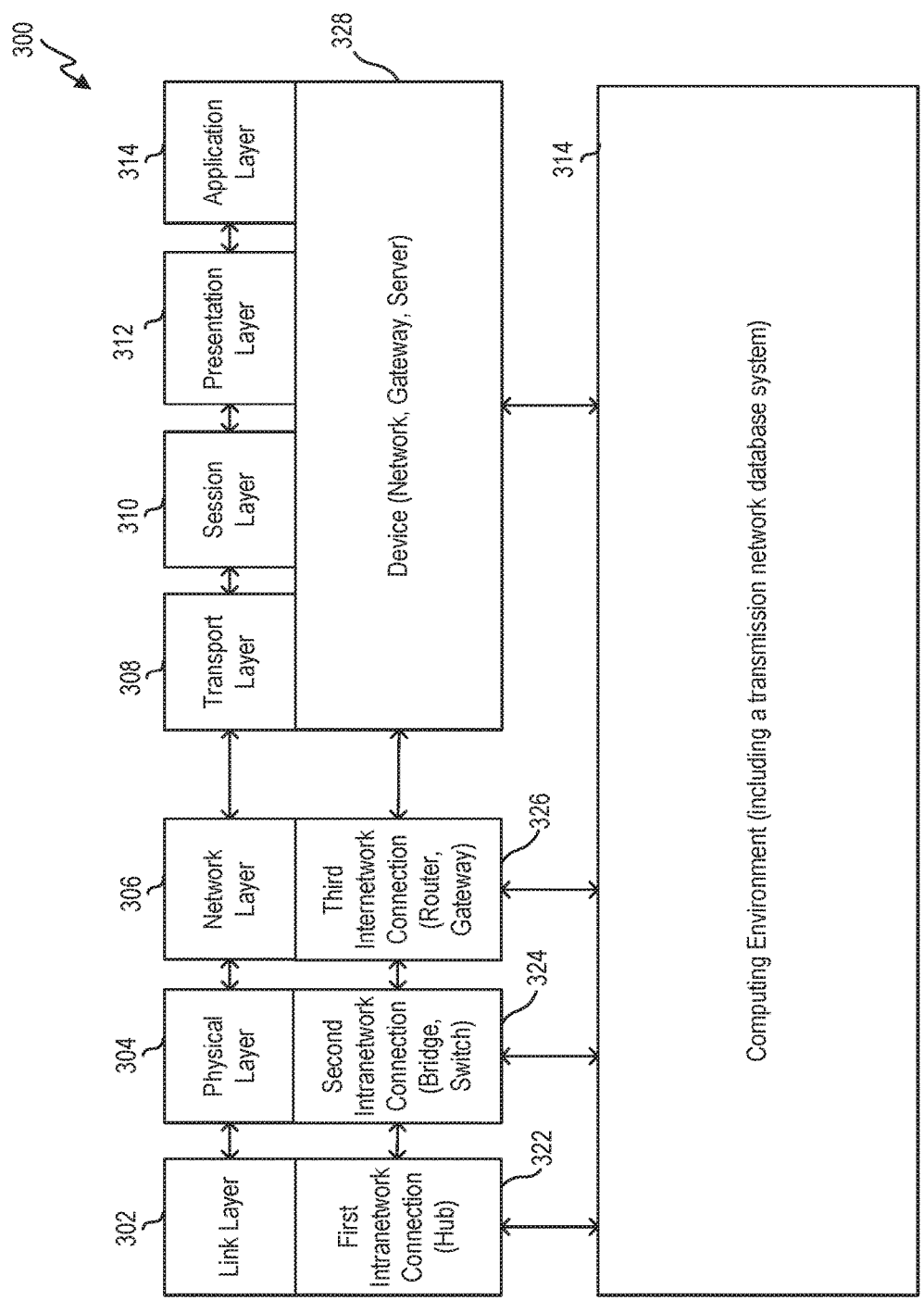
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
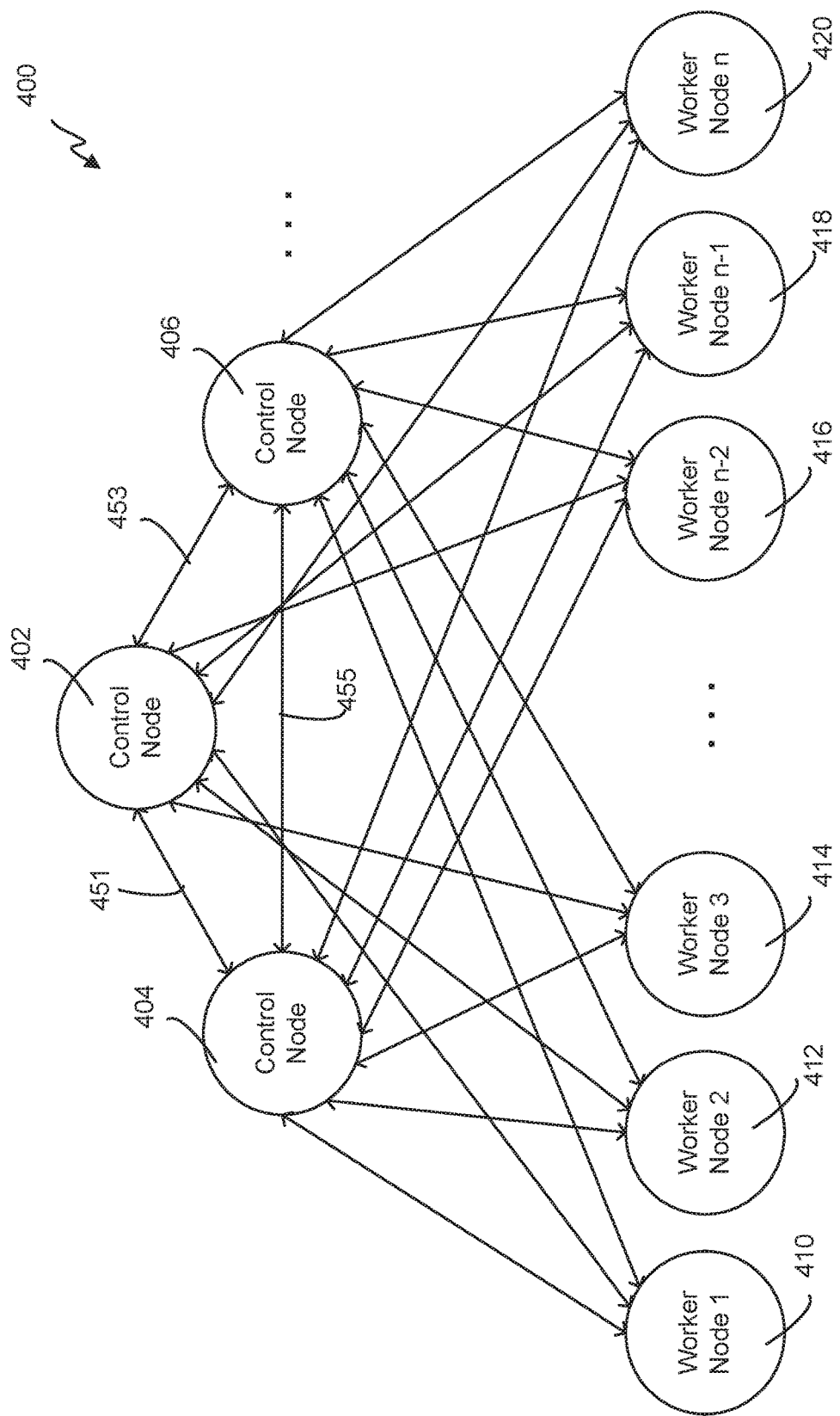
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
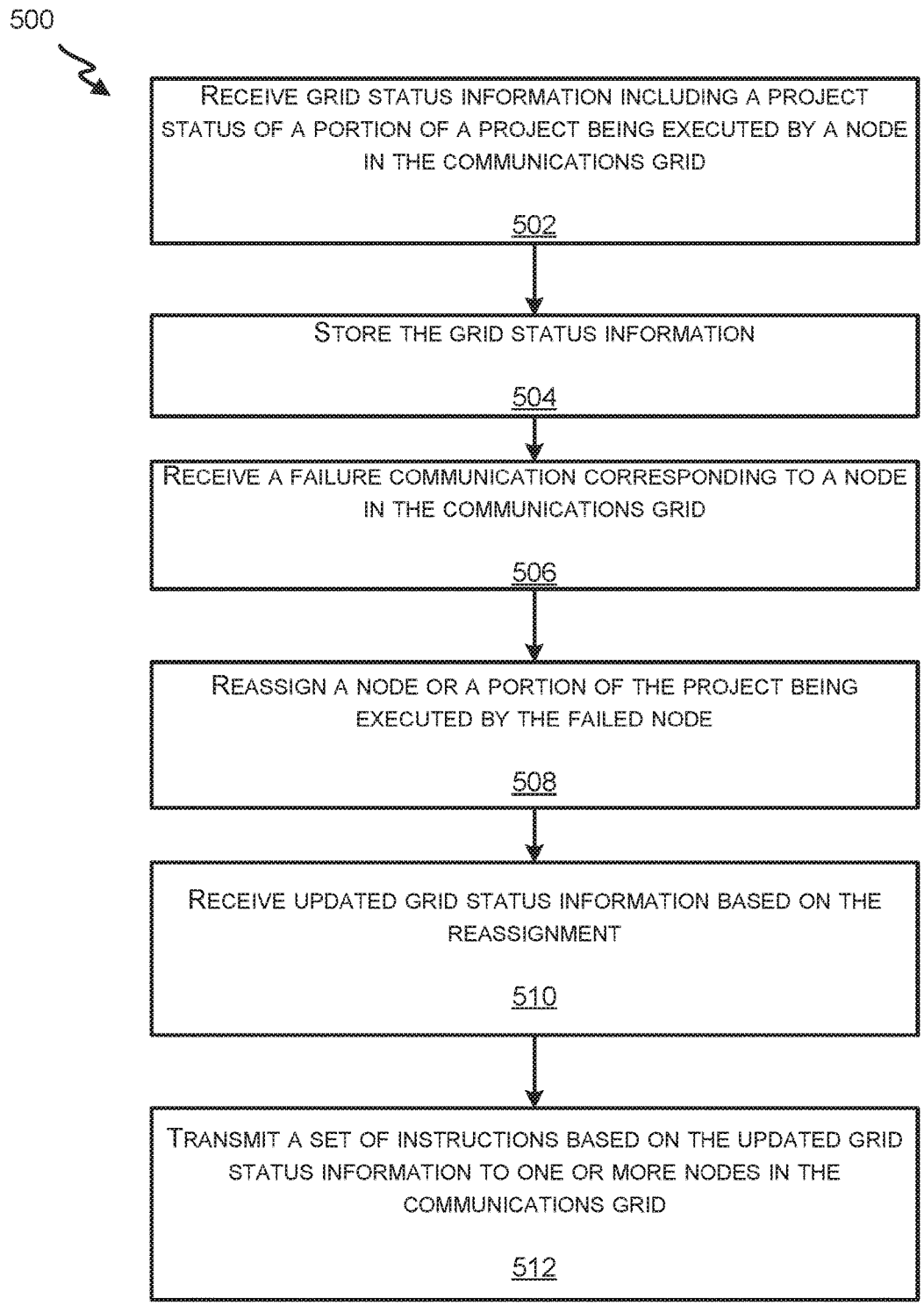
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
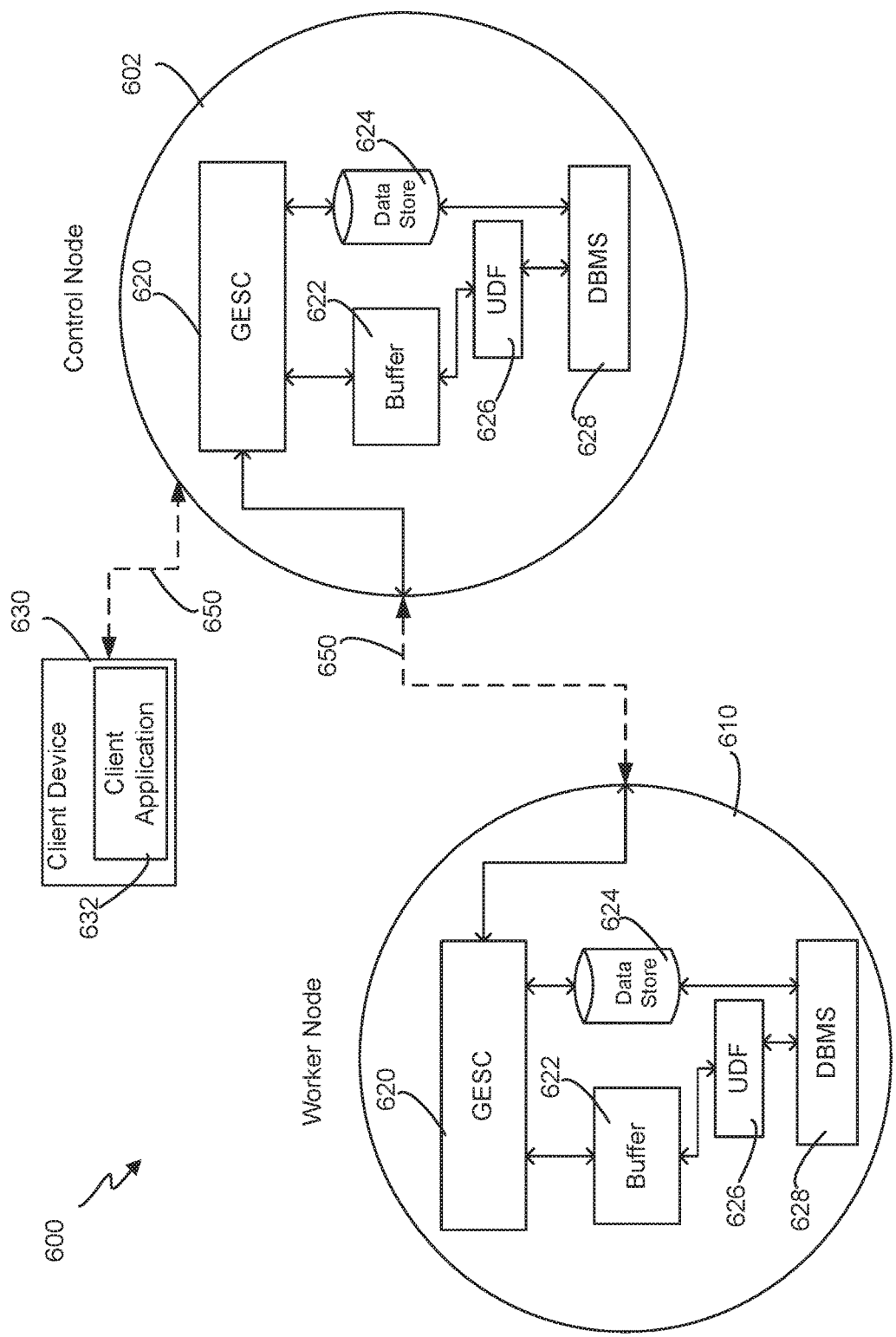
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
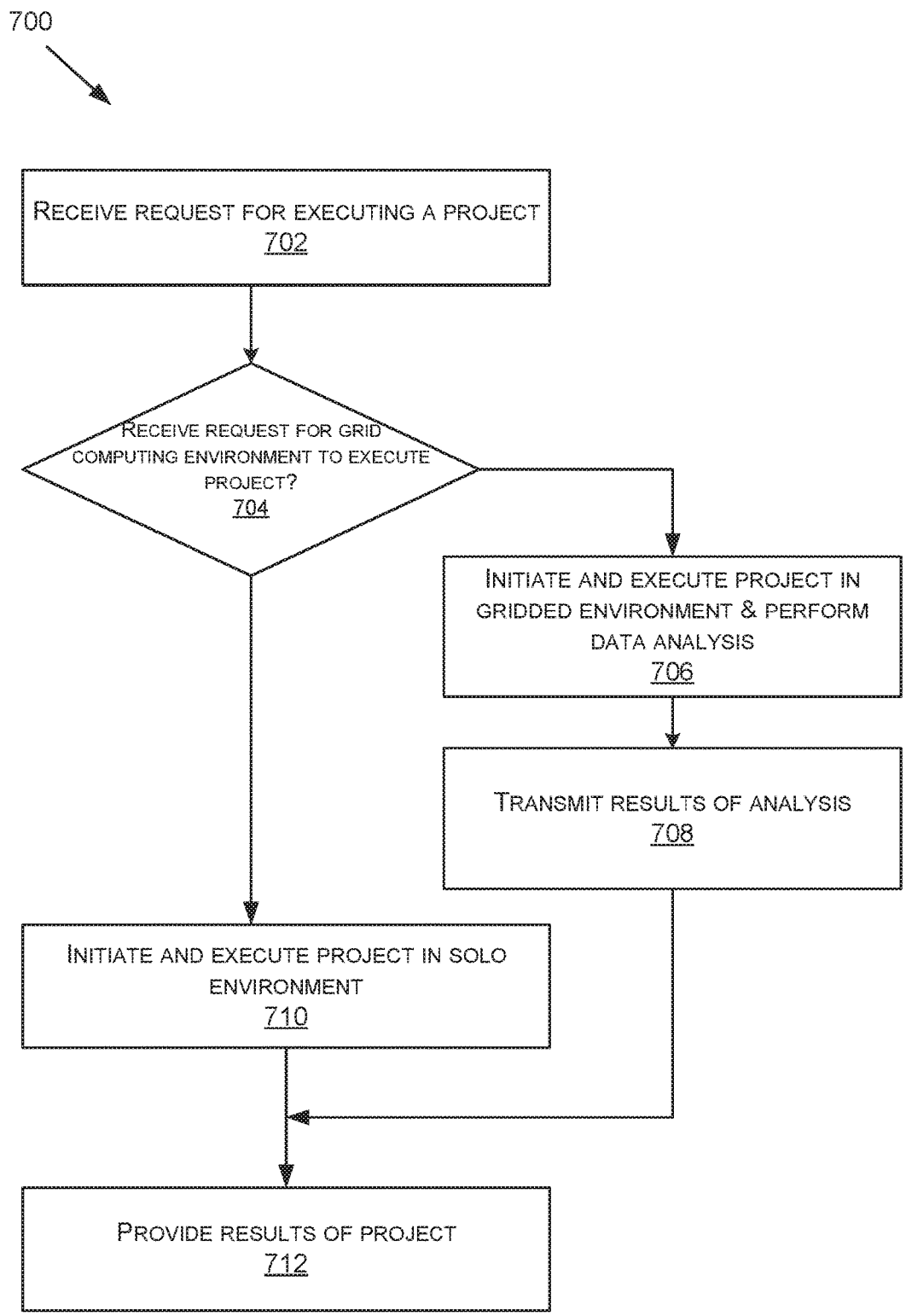
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
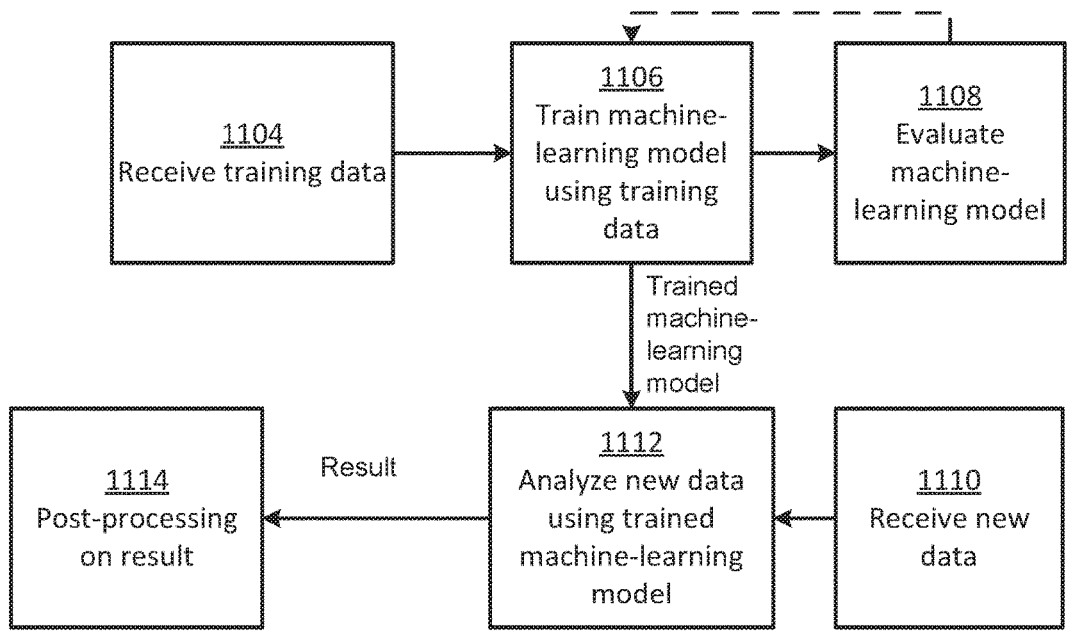
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
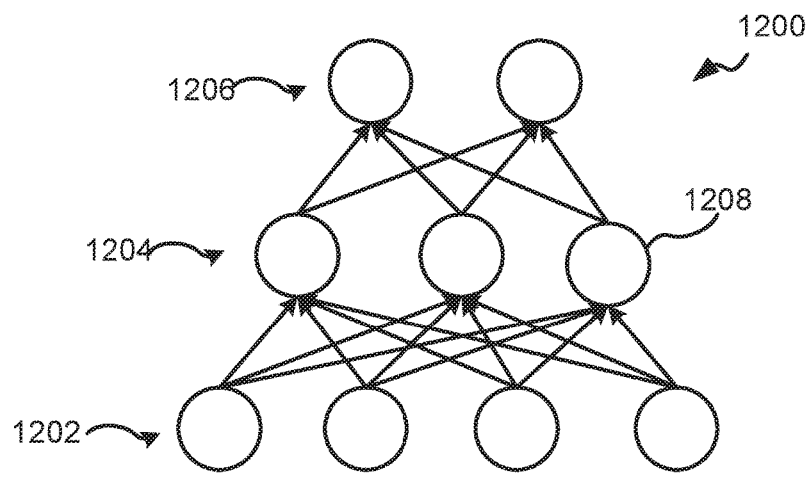
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
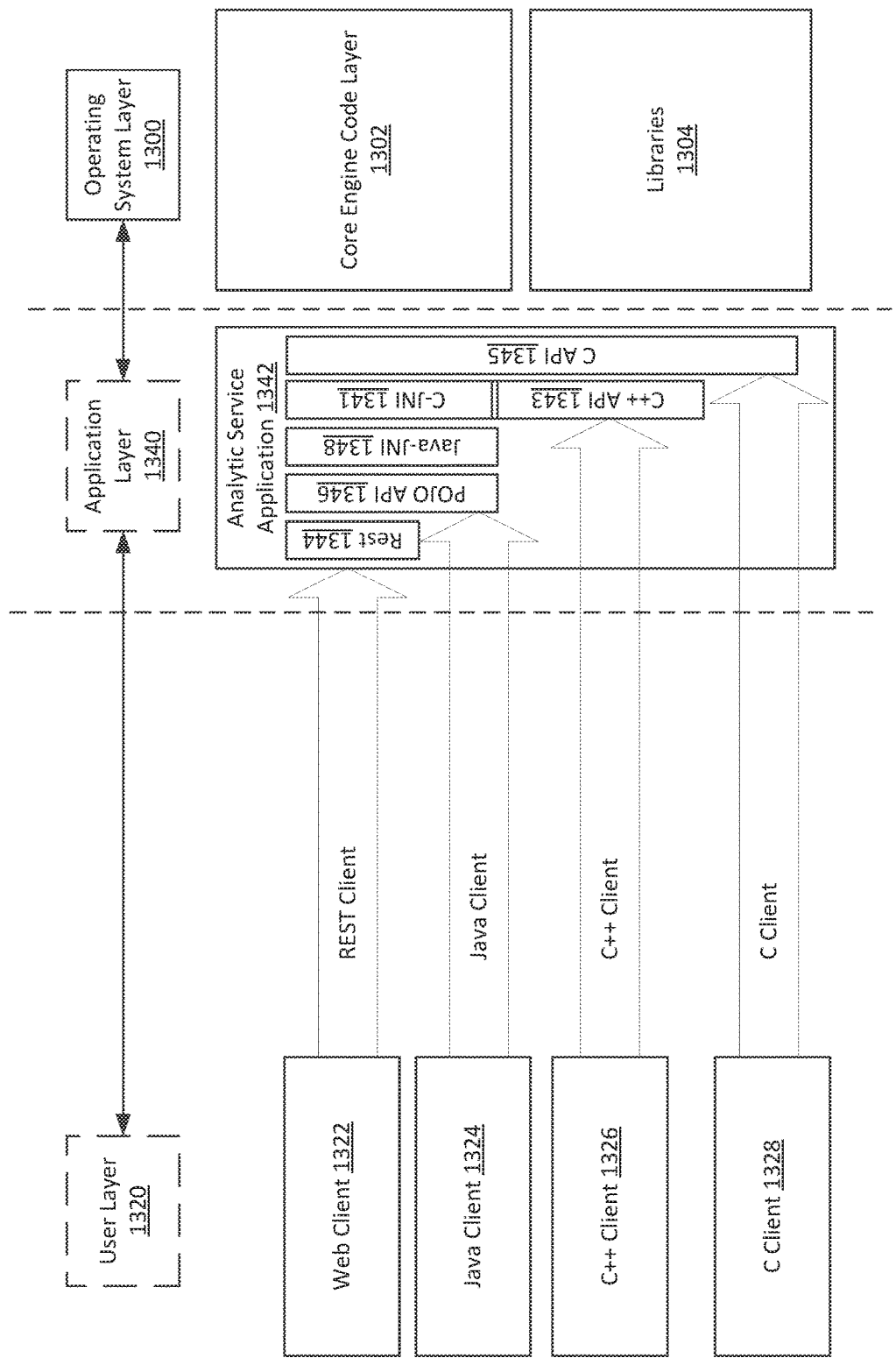
FIG. 13 illustrates an example layered architecture in at least one embodiment.

FIG. 13 illustrates an example layered architecture for a computing device or system comprising an operating system layer 1300, user layer 1320, and an application layer 1340. The operating system layer 1300 comprises a core engine code layer 1302 (e.g., a Micro Analytic Service Core) and one or more libraries 1304 (e.g., SAS® Threaded Kernal Libraries, IBM® Libraries or Oracle® libraries). A Micro Analytic Service Core is an example of a multi-threaded service. A thread represents or otherwise identifies a series of one or more operations according to programed instructions of a process. A process or multiple processes can have multiple threads that each concurrently use a common memory or database to execute an operation.

The application layer 1340 includes one or more analytic service applications 1342 as an interface between the operating system layer 1300 and a user layer 1320. For instance, as shown in FIG. 13, the analytic service applications 1342 include a REpresentational State Transfer (REST) application programming interface (API) layer 1344, a Java plain old Java object (POJO) API (POJO API) layer 1346, and a Java-Java native interface (Java-JNI) layer 1348 written in the Java programming language. Analytic service application 1342 further includes a C++ API layer 1343, a C-JNI layer 1341, and a C API layer 1345.

In the user layer 1320, clients, e.g., Web clients 1322 (REST clients), Java clients 1324, C++ clients 1346 (e.g., ESP as described above), C clients 1328, may implement various applications that interface with analytic service applications 1342 (e.g., an analytic creation application or an analytic execution application). For instance, Java clients 1324 can integrate with the POJO API layer 1346. The POJO API layer may communicate with the core engine code layer 1302 in-process through the Java-JNI layer 1348. Web clients 1322 may interface with the REST API layer that provides persistence and clustering for scalability and high availability. For example, an analytic creation application may be implemented using the SAS® Enterprise Decision Manager that generates DS2 programs that implement user-created rule sets and rule flows. SAS® Enterprise Decision Manager can combine analytics, such as score code generated by SAS® Enterprise Miner, with business rules to form decision logic. Analytic service application 1342 is used to compile and execute the generated score code provided as an input.

Clients may use different transport protocols, e.g., Web clients 1322 may use HyperText Transfer Protocol (HTTP), Simple Network Management Protocol (SNMP), Simple Mail Transport Protocol (SMTP), etc.

The REST API layer 1344 handles certain functionality automatically, such as initialization and user context management. The POJO API layer 1346 and C API layer 1345 provide methods to control these elements directly.

Some layers are positioned between the REST API layer 1344 and the C API layer 1345 (e.g., Java-JNI layer 1348).

Interface layers may be strictly one-way such that the C API 1345 does not depend on the REST API 1344 layer, the POJO API layer 1346, or the Java-JNI layer 1348. C clients 1328 can omit the Java layers altogether. The POJO API layer 1346 communicates with the core engine code layer 1302 strictly through the C API layer 1345, but does not depend on the REST API layer 1344. Similarly, the REST API layer 1344 communicates with the core engine code layer 1302 strictly through the POJO API layer 1346 and the Java-JNI layer 1348.

Analytic service application 1342 may be deployed as a web application executing on one or more Web application servers implemented using Base SAS®. The REST API layer 1344 provides an interface for web client applications to compile and execute source code into operations (method, subroutines, functions) that provide near real-time analytic capabilities. A operation is a set of instructions designed to perform a predefined operation within a program. The REST API layer 1344 supports the execution of DS2 source code and provides the ability to run SAS® Enterprise Miner score code (possibly converted from a SAS® DATA operation to DS2) as well as user-written functions.

For illustration, the REST API layer 1345 may provide the following POST methods: 1) a create revision method that publishes source code in memory with a request body that contains DS2 source code as an input, 2) a validate revision method that validates the request body of input values required by the DS2 source code and returns validation results, and 3) an execute revision operation method that validates and executes the published source code with a request body of input values required by the DS2 source code. Source code is published and stored in analytic data. The REST API layer 1345 further may provide an update revision context PUT method that publishes updated source code in memory with a request body containing the DS2 source code as input.

The REST API layer 1345 further may provide a delete revision DELETE method that removes source code from memory. The REST API layer 1345 may provide the following GET methods: 1) an individual revision query method that returns detailed information about a revision, 2) a revision operations query method that returns a list of operations available in the published source code, 3) an individual revision operation query method that returns detailed information about the inputs required by the operation and the outputs produced by the step, 4) a retrieve revision details query method that returns information such as the name of the published source code, the revision number, and a list of compiled operations of the published source code. The REST API layer 1345 may support JSON resource representations. A "step" includes any of a method of the DS2 package, a subroutine of a C program, or a function of a Python script.

The POJO API layer 1346 supports similar functionality as the C API layer 1345. The POJO API layer 1346 allows tightly coupled Java client applications to interact with analytic service application 1342 directly through Java method calls by not hiding detailed functionality. In contrast, the REST API layer 1344, in the interest of simplicity, handles many interactions automatically. The POJO API layer 1346 enables client-supplied DS2, Python, C, and ASTORE analytic source code programs to be published to analytic service application 1342, where they are compiled into modules and made available for repeated execution by storing in analytic data. The POJO API layer 136 also includes methods for querying information about currently loaded content, such as user contexts, modules, revisions, and operation signatures (input and output parameters). In one or more embodiments a layered architecture as described in FIG. 13 is implemented using a computing device as described herein.

Figure 14:
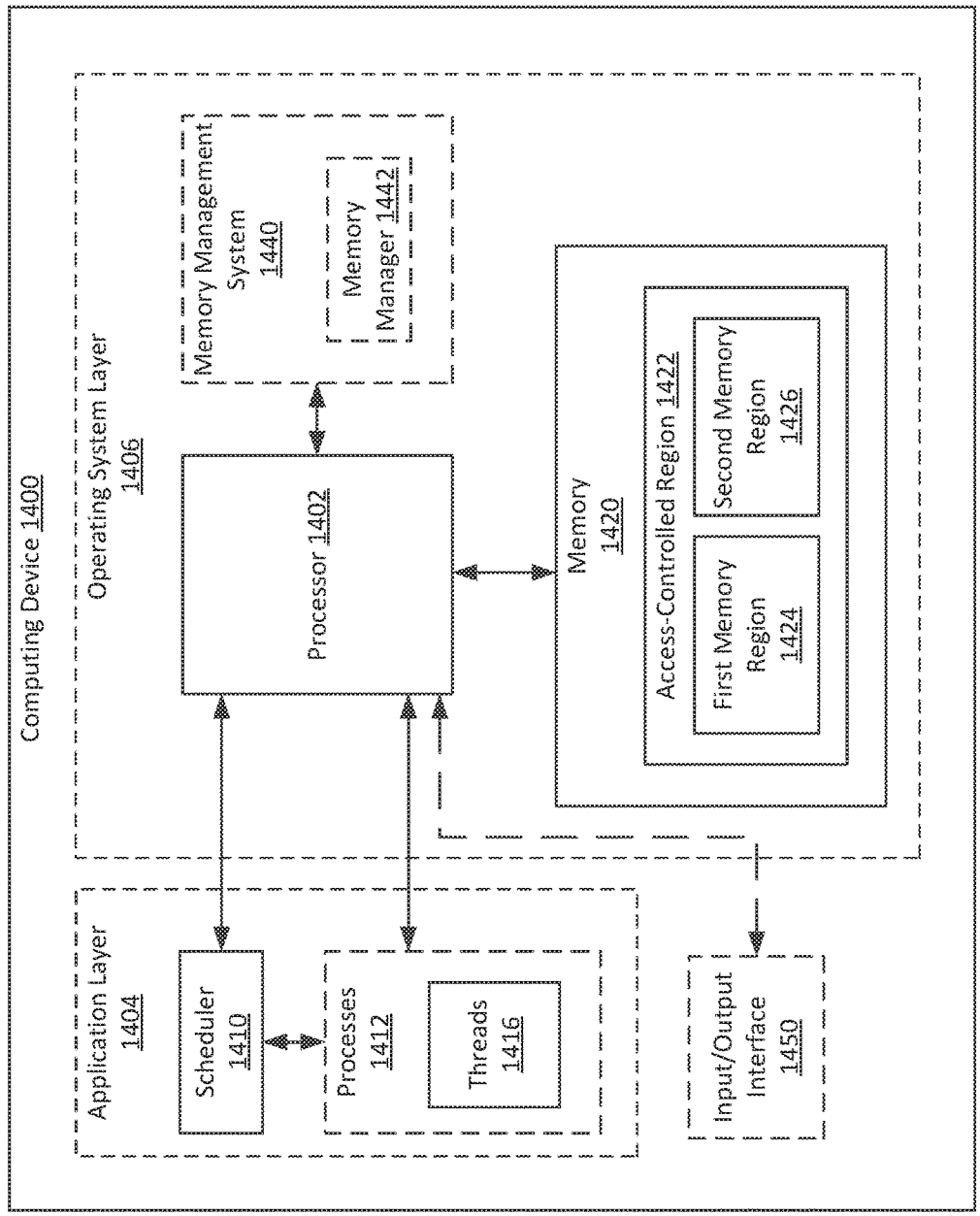
FIG. 14 illustrates an example of a block diagram of a computing device in at least one embodiment.

FIG. 14 illustrates a computing device 1400. The computing device 1400 includes a processor 1402 and a memory 1420.

Memory 1420 is an electronic holding place or storage for information so the information can be accessed by processor 1402. Memory 1420 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1402 executes instructions (e.g., stored in memory 1420). The instructions can be carried out by a special purpose computer, logic circuits, or hardware circuits. In one or more embodiments, processor 1402 is implemented in hardware and/or firmware. Processor 1402 executes an instruction, meaning it performs or controls the operations called for by that instruction. The term "execution" is the process of running an application or the carrying out of the operation called for by an instruction. The instructions can be written using one or more programming language (e.g., using clients as described herein), scripting language, assembly language, etc. Processor 1402, in one or more embodiments, can retrieve a set of instructions from a permanent memory device and copy the instructions in an executable form to a temporary memory device that is generally some form of RAM, for example.

In one or more embodiments, computing device 1400 is part of a layered architecture (e.g., a layered architecture shown in FIG. 13). For instance, an operating systems layer 1406 (e.g., operating system layer 1300) provides for the orderly control of resources in the operating system (e.g., processor 1402 and memory 1420) by other layers (e.g., applications in an applications layer 1406). For instance, processor 1402 executes instructions according to threads 1416 that each indicate a set of one or more operations associated with a respective thread. For instance, the operations define requests to read or write to memory 1420 controlled by operating system layer 1406. In one or more embodiments, the threads 1416 are part of one or more processes 1412 that define a collection of threads for implementing a process of an application of the computing device 1400. Threads could be implemented at an application layer 1404, as shown in FIG. 14. Alternatively, threads could be defined by an operating system layer 1406.

In one or more embodiments, one or more regions are allocated by the operating system layer in the memory 1420 for use by applications of the computing device 1400. Regions as used herein may define sets of contiguous or noncontiguous memory elements for storing data.

As shown in FIG. 14, memory 1420 has an access-controlled region 1422 that is shared by threads 1416. For instance, the access-controlled region 1422 defines a boundary for various contiguous or noncontiguous memory elements within the memory 1420 that threads 1416 can access (e.g., to read or write to a memory element of the access-controlled region 1422). One example of an access-controlled region in a computing device is a critical section or critical region that is used to control (e.g., prohibit) multiple processes or threads from accessing a shared memory region in the access-controlled region at the same time.

One way access is prevented is using a busy lock or a spinlock that prevents multiple process or threads from accessing the memory at the same time. In some implementations to access a shared data structure or critical section of a memory, a thread needs to acquire a so called "lock". The lock indicates the resource is locked to other threads. In one or more embodiments, a thread accessing the memory holds a so called "spin lock". A spin lock causes another thread to wait in a loop "spin" while repeatedly checking to see if the spin lock is available. Since the thread waiting for the spin lock remains active but is not performing a useful operation, the spin lock is also referred to as busy waiting or a busy lock. Once acquired, spin locks will usually be held until they are explicitly released. In some implementations they can be automatically released if the thread that holds the spin lock "goes to sleep". Alternatively or additionally to a spin lock, access is prevented using a YIELD( ) operation or WAIT( ) operation. YIELD( ) keeps a thread active, placing it on the end of a ready to run list. WAIT( ) places the thread on a busy list. In either case, a thread gives up its execution time to catch the small chances when the thread holding a spin lock loses its time quanta and is yielded to other threads waiting for the same lock.

As shown in FIG. 14, the access-controlled region 1422 can have different memory regions (e.g., first memory region 1424 and second memory region 1426) each with their own allocated respective sets of the contiguous or noncontiguous memory elements. The computing device, despite the different memory regions, presents a single represented memory region (e.g., to the threads 1416 and/or processes 1412). Alternatively, or additionally, the computing device presents a single represented memory region to an entity outside the computing device reachable via the input/output interface 1450.

Various applications within the layered architecture can define schemes for control of access to the access-controlled region. For instance, as shown in FIG. 14, a scheduler 1410 implements a control scheme for the access-controlled region 1422. The scheduler 1410 schedules access for the threads 1416 across the boundary of the access-controlled region 1422. For instance, the scheduler 1410 schedules access for the threads 1416 to various regions within the access-controlled region 1422 (e.g., a first memory region 1424 or a second memory region 1426). Accordingly, the scheduler also schedules access for a process 1412 corresponding to the threads 1416.

The scheduler 1410, as shown in FIG. 14, executes operations necessary to implement access to the access-controlled region 1422. In one or more embodiments, it is an execution at an applications layer 1404 and could be implemented as part of the execution of a thread 1416 defined at the applications layer 1404. However, in other embodiments, the execution of the scheduler 1410 is implemented within the operating system layer 1406 (e.g., within or in cooperation with a memory management system 1440 or as part of a thread of the operating system layer 1406). In one or more embodiments, a memory management system 1440 implements operations (e.g., as directed by memory manager 1442) on memory 1420. For instance, the operations can include copying data from one memory region (e.g., first memory region 1424) to another memory region (e.g., second memory region 1426), locking a memory from access, allocating a memory region, and deallocating a memory region within the memory 1420.

In one or more embodiments, the functionality of the scheduler 1410, processes 1412, threads 1416, memory management system 1440, memory manager 1442 are all executed according to instructions stored in a computer readable medium (e.g., memory 1420). Applications stored on computer-readable medium are implemented in software (e.g., computer-readable and/or computer-executable instructions) stored in computer-readable medium and accessible by processor 1402 for execution of the instructions. The applications can be written using one or more programming languages, assembly languages, scripting languages, etc. as described herein.

In one or more embodiments, computing device 1400 is a plurality of devices or interacts with other devices not shown (e.g., input and output devices). In one or more embodiments, fewer, different, and additional components can be incorporated into computing device 1400.

In one or more embodiments, the computing device 1400 implements a method as described herein (e.g., a method shown in FIG. 15) for scheduling access to an access-controlled region (e.g., access-controlled region 1422) during copy of data from a first memory region to a second memory region (e.g., between first memory region 1424 and second memory region 1426). For instance, in one or more embodiments, the method enables, during the copying, to the second memory region, of the data copied from the first memory region, blocking access from threads accessing a first memory region for write requests without blocking access for read requests from the threads. In this way processing capabilities of a computing device can be improved over traditional methods that blocked all access to a memory during a copying event (e.g., using locks).

Figure 15:
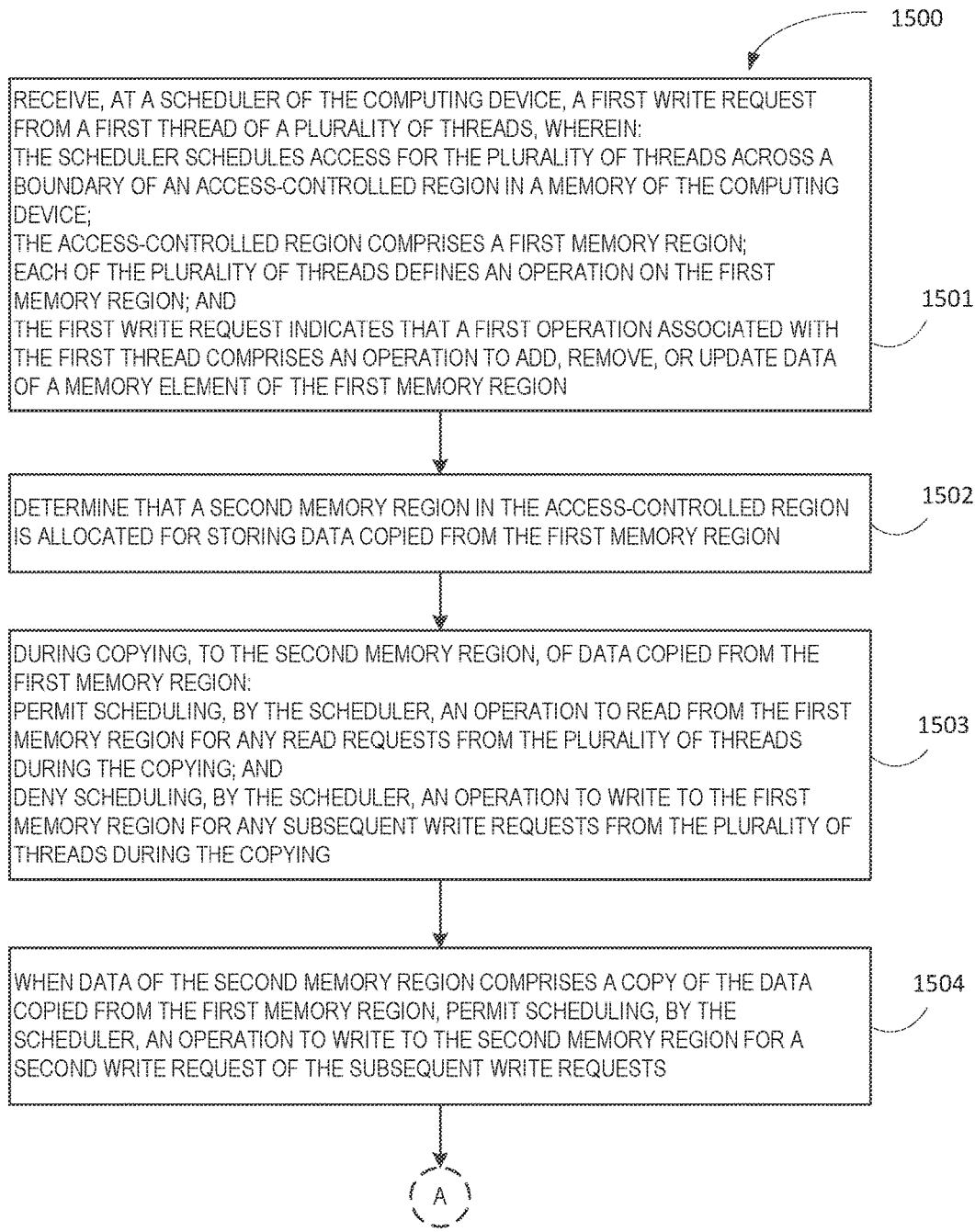
FIG. 15 illustrates an example of a flow diagram for a method of permitting scheduling in at least one embodiment.

FIG. 15 illustrates a flow diagram for an example method 1500 of permitting scheduling in at least one embodiment. In one or more embodiments, the method 1500 can be implemented by a scheduler 1410 of computing device 1400. Alternatively, or additionally the method 1500 is implemented in whole or in part by another entity in the application layer or operating system layer (e.g., by an entity in the memory management system 1440).

The method 1500 illustrates an operation 1501 for receiving, at a scheduler of a computing device, a first write request from a first thread of a plurality of threads (e.g., threads 1416). The scheduler schedules access for the plurality of threads across a boundary of an access-controlled region (e.g., access-controlled region 1422) in a memory (e.g., memory 1420) of the computing device. The access-controlled region comprises a first memory region (e.g., first memory region 1424). Each of the plurality of threads indicate an operation associated with the respective thread. The first write request indicates that a first operation associated with the first thread comprises an operation to add, remove, or update data of a memory element of the first memory region.

The method 1500 illustrates an operation 1502 for determining that a second memory region (e.g., in the access-controlled region) is allocated for storing data copied from the first memory region. A computing device (e.g., a memory management system of a computing device) could allocate a second memory region in the access-controlled region for a number of reasons. A few illustrative and non-limiting examples are described below.

In a first example, the write request indicates a request to update a memory element of the first memory region and the computing device is designed to implement the update by copying all the non-updated data to the second memory region (e.g., a second memory region with the same number of memory elements as the first memory region), and then adding the updated data to the second memory region.

In a second example, the write request indicates an add operation to add a memory element of the first memory region. The computing device determines that in order to accommodate the add operation, the first memory region should have more memory elements than a total number of memory elements of the first memory region. The second memory region can be allocated with a greater number of memory elements than the first memory region.

In a third example, the write request indicates a delete operation to remove a memory element of the first memory region. The computing device determines that in order to accomodate the delete operation, the first memory region should have less memory elements than a total number of memory elements of the first memory region. For instance, it may be advantageous to utilize less memory resources if less data storage is required. The second memory region can be allocated with a fewer number of memory elements than the first memory region.

In a fourth example, the allocation of the second memory region is independent or otherwise triggered by factors independent of the particular write request. For instance, copying could be a routine aspect to ensure data integrity. Of course, one of ordinary skill in the art will appreciate other reasons a second memory region could be allocated for storing data copied from the first memory region of a same or a different size than the first memory region.

The method 1500 illustrates an operation 1503 during copying, to the second memory region, data copied from the first memory region. The scheduler, according to operation 1503, permits scheduling an operation to read from the first memory region for any read requests from the plurality of threads during the copying. In this way the threads can still access the first memory region during copying. The scheduler, according to operation 1503, denies scheduling an operation to write to the first memory region for any subsequent write requests from the plurality of threads during the copying. In this way the scheduler protects the first memory region from implementing changes to the first memory region during the copying.

Other operations can take place before, during or after copying of the data of the first memory region to the second memory region. For instance, the scheduler can allow scheduling of access to write data to the first memory region according to the first write request. Subsequently, the data stored within the first memory region is then copied to the second memory region. Alternatively, the scheduler can prevent scheduling access according to techniques described herein to the first memory region (e.g., a spin lock). The scheduler can then permit scheduling access to the second memory region during or after copying of data to the second memory region.

The method 1500 illustrates an operation 1504 when data stored within the second memory region comprises a copy of the data copied from the first memory region. The scheduler, according to operation 1504, permits scheduling an operation to write to the second memory region for a second write request of the subsequent write requests. In this way, the scheduler moves access for the threads from the first memory region to the second memory region.

In one or more embodiments, the computing device represents only one represented memory structure to each of the plurality of threads during a time when both the first memory region and the second memory region comprises data of the first memory region during the quiescing state. Thus, the second write requests or any of the other subsequent write requests are requests with respect to the represented memory structure. For instance, the subsequent write requests comprise an update request to change data at a given memory element in the represented memory structure; an insert request to insert data to a memory element (which could be occupied or unoccupied) in the represented memory structure; a write request to write to an unoccupied memory element in the represented memory structure; a delete request to remove data from an occupied memory element in the represented memory structure; and/or a defragmentation request to move data within the memory region. In one or more embodiments, data as described herein is a value or a memory object.

Figure 16A:
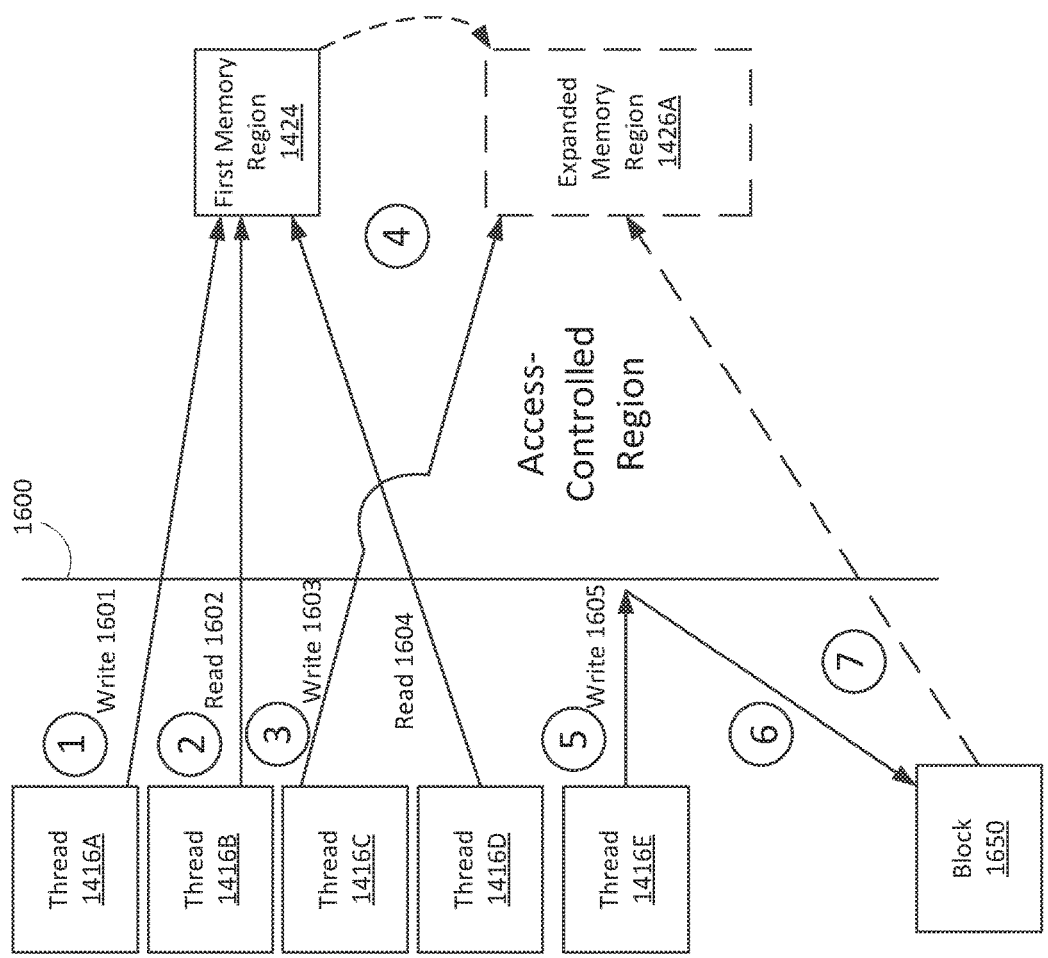
FIGS. 16A-C illustrates an example for a transmission diagram for a computing device in at least one embodiment.
Figure 16B:
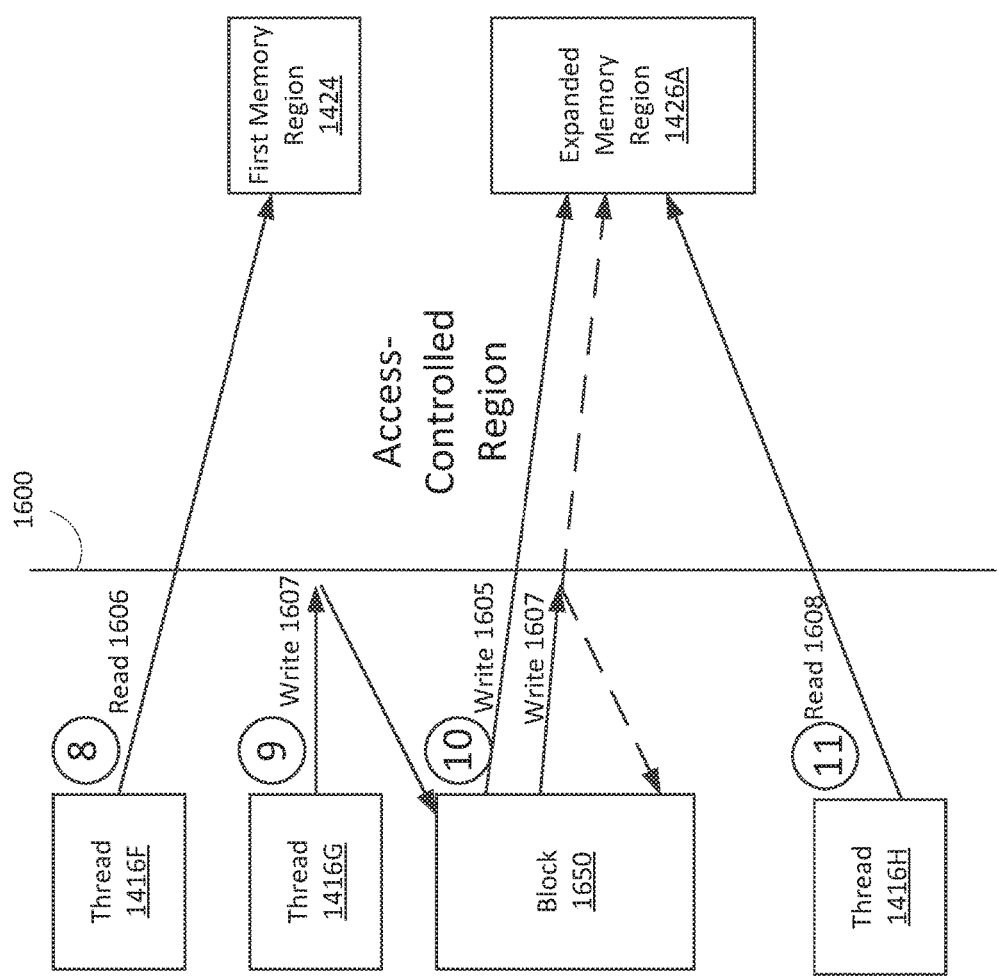
Figure 16C:
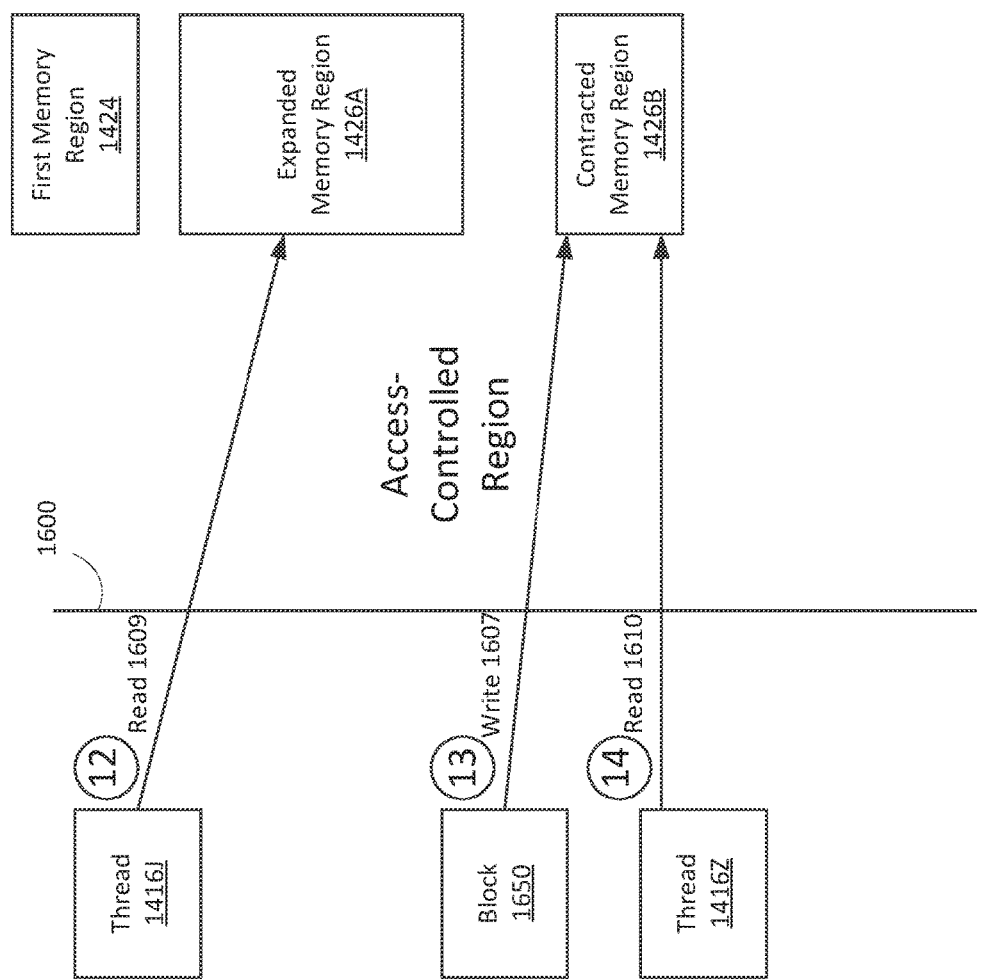

FIGS. 16A-16C illustrate a transmission diagram for a computing device (e.g., computing device 1400) in at least one embodiment. A plurality of threads (e.g., threads 1416A-E) according to FIG. 16A request access across a boundary 1600 of an access-controlled region (e.g., access-controlled region 1422).

As shown in FIG. 16A, in operation 1, executing the operation of thread 1416A causes a write request (Write 1601) to request access across the boundary 1600 to write to one or more memory elements of a first memory region 1424. The computing device permits access to the first memory region 1424 for Write 1601. For instance, a computing device in one or more embodiments permits access by having a scheduler (e.g., scheduler 1410) of the computing device schedule or permit scheduling of operations to access the first memory region 1424. Alternatively or additionally, a memory management system (e.g., 1440) of the computing device permits access to the first memory region 1424.

In operation 2, executing the operations of thread 1416B causes a read request (Read 1602) to request access across the boundary 1600 to read from one or more memory elements of a first memory region 1424. The one or more read requests could request to access the same or different memory elements of a first memory region 1424. One of ordinary skill in the art will appreciate that the one or more read requests and one or more write requests could come in any order (e.g. operation 2 could occur before operation 1). The computing device permits access to the first memory region 1424 across the boundary 1600 as described herein. The computing device can allow concurrent access to the first memory region (e.g., if the requests arrive at a same time). For instance, the scheduler schedules concurrent access for the threads 1416A and 1416B in the access-controlled region.

In operation 3, during executing the operations of thread 1416B, an expanded memory region 1426A is allocated in the access-controlled region for storing data copied from the first memory region 1424. For example, the write request (Write 1603) from a thread 1416C triggers a computing device (e.g., a memory manager 1442 of computing device 1400) to allocate expanded memory region 1426A for use by the threads 1416. In one or more embodiments, after the operations of thread 1416A and thread 1416B, the threads will no longer have visibility to first memory region 1424. In this example, expanded memory region 1426A is an expanded memory region that has a greater capacity for data storage than the first memory region 1424. Of course, expanded memory region 1426A in alternative scenarios described above could have the same capacity for data storage or less capacity for data storage as the first memory region 1424.

In operation 4, data is copied from the first memory region 1424 to expanded memory region 1426A, during this copying one or more read requests (e.g., Read 1604 from a thread 1416D) requests access across boundary 1600. The computing device (e.g., a scheduler of the computing device) permits scheduling of an operation to read from the first memory region 1424 during the copying.

In operation 5, data is still being copied to the expanded memory region 1426A. During this copying, one or more write requests (e.g., Write 1605 from a thread 1416E) requests access across boundary 1600. The computing device (e.g., a scheduler of the computing device) denies an operation to write to the first memory region 1424. As shown in FIG. 16A, in operation 6, rather than permit access for Write 1605, Write 1605 is in a block state 1650 while the read requests do not enter a block state. Block state 1650 could be implemented by the computing device using a number of different approaches. For instance, a spin lock is implemented on thread 1416E. Thread 1416E must then wait until operations are complete for the copying triggered by Write 1603 before thread 1416E is scheduled for access to the expanded memory region 1426A. Of course, other implementation approaches could be used for a write request to enter a block state 1650. For example, the write request could be stored in a queue. Alternatively or additionally, the computing device (e.g., in the application layer) could allow an entity in a user layer to specify a customized implementation design for waiting.

In optional operation 7, once the expanded memory region 1426A has a copy of the data elements from the first memory region, the computing device (e.g., a scheduler of the computing device) permits scheduling an operation to write to the expanded memory region 1426A. The Write 1605 can then transition from the block state 1650 to write to the expanded memory region 1426A.

Alternatively, as shown in FIG. 16B, at operations 8 and 9, the expanded memory region 1426A still does not have a copy of the data of the first memory region. Subsequent read requests (e.g., Read 1606 from thread 1416) at operation 8 is scheduled for an operation on the first memory region 1424. Subsequent write request (e.g., Write 1607 from thread 1416G) is put in a block state 1650 as described with respect to Write 1605.

At operation 10, once the expanded memory region 1426A has a copy of the first memory region, the computing device (e.g., a scheduler of the computing device) permits scheduling an operation to write to the expanded memory region 1426A. For instance, as shown in FIG. 16B, Write 1605 and Write 1607 are scheduled to access the expanded memory region 1426A in the order in which they are received. Of course different orders could be permitted. FIG. 16B shows both Write 1605 and Write 1607 accessing the expanded memory region 1426A. Alternatively, only Write 1605 accesses the expanded memory region 1426A because Write 1607 also triggers the need for a subsequent memory region. In this case Write 1607 returns to or does not transition from block state 1650 to wait for a new expanded memory region.

At operation 11, subsequent read requests (e.g., Read 1608 from thread 1416H) are then scheduled for access to the expanded memory region 1426A.

FIG. 16C shows a transmission diagram assuming Write 1607 triggers a contracted memory region 1426B that has less data storage than the expanded memory region 1426A. Of course, contracted memory region 1426B could instead have the same or different storage under other scenarios described herein. At operation 12, subsequent read requests (e.g., Read 1609 from thread 1416J) are permitted to access expanded memory region 1426A. At operation 13, contracted memory region 1426B comprises a copy of data of expanded memory region 1426A, and Write 1607 is scheduled to access the contracted memory region 1426B. At operation 14, subsequent read requests (e.g., Read 1610 from thread 1416Z) are permitted to access contracted memory region 1426B.

In one or more embodiments, additional communication, not shown in FIGS. 16A-16C, is included for returning requested information (e.g., data read from a memory element).

As shown in FIG. 16C, one or more embodiments comprise the allocation of a plurality of memories (e.g., a plurality of buffers). In one or more embodiments, the computing device 1400 manages the different memories and the resource usage of those memories. For instance, a memory management system 1440 of an operating system layer 1406 in one or more embodiments manages the different memories (e.g., by assessing a resource usage of the access-controlled region.

Figure 17:
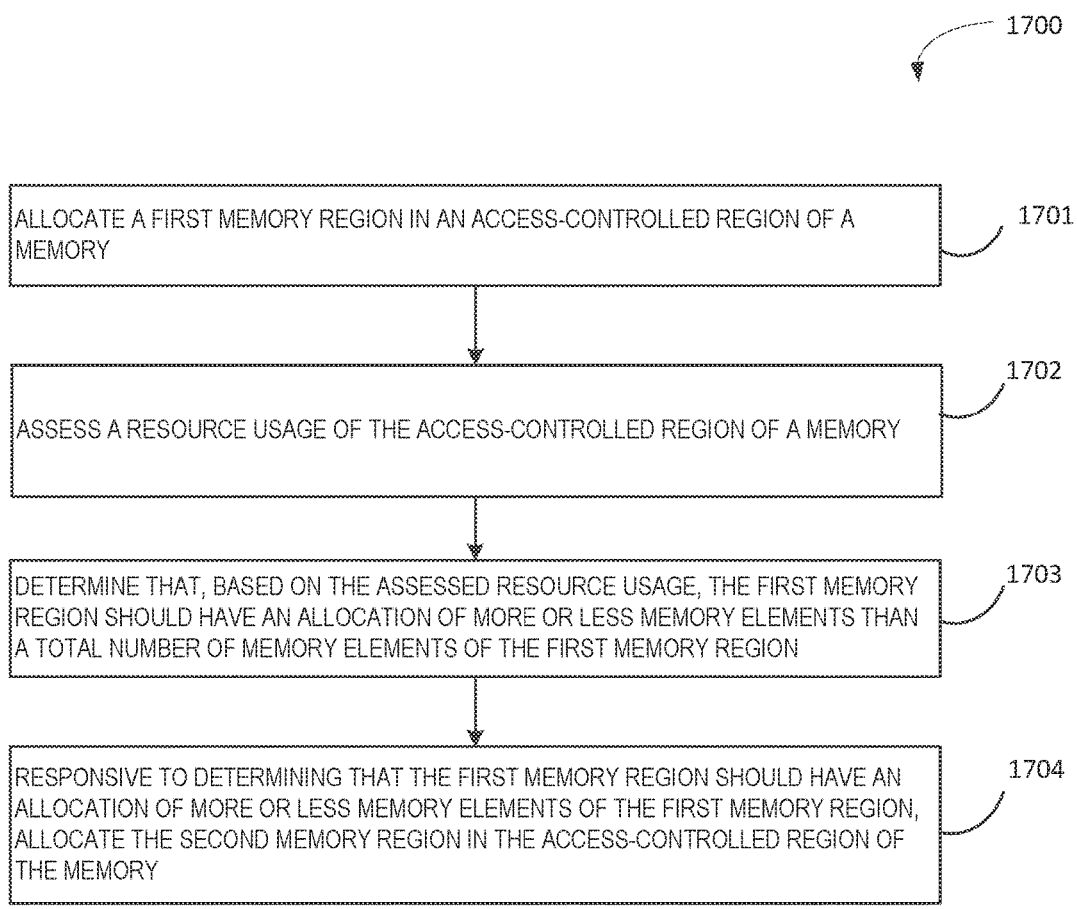
FIG. 17 illustrates an example flow diagram for managing memory of a computing device in at least one embodiment.

FIG. 17 illustrates a flow diagram for a method 1700 of managing memory of a computing device in at least one embodiment. For instance, a memory manager 1442 or other entity in a memory management system 1440 of a computing device 1400 in one or more embodiments implements operations to manage a memory 1420.

In an operation 1701, the method 1700 comprises allocating a first memory region in an access-controlled region (e.g., first memory region 1424 in access controlled region 1422). For example, allocating a first memory region in one or more embodiments includes determining a first pointer to the first memory region. Additionally, in one or more embodiments allocating a first memory region includes indexing a first set of memory elements in the first memory region relative to the first pointer. The first set of memory elements defines a size of the first memory region.

In an operation 1702, the method 1700 comprises assessing a resource usage of the access-controlled region of a memory. For example, in one or more embodiments, a computing device assesses resource usage in response to a write request that triggers allocation of another memory region as described herein. The write request may place greater or less demands on resource usage in the memory. For instance, the triggering write request could be a delete request that deletes data from an occupied memory element, which would place less demands on resource usage in the memory. As another example, the triggering write request could be an insert request to insert data (e.g., in an unoccupied memory element), which would place greater demands on resource usage.

In an operation 1703, the method 1700 comprises determining that, based on the assessed resource usage, the first memory region should have an allocation of more or less memory elements than a total number of memory elements of the first memory region.

For instance, in one example, operation 1703 comprises determining, based on the assessed resource usage, the first memory region should have more memory elements than a total number of memory elements of the first memory region. In this example, it can then be further determined that the second memory region expands the first memory region to have more data storage than the first memory region. Operations can then be scheduled (e.g., by a scheduler 1410) based on an expanded memory structure.

In another example, operation 1703 comprises determining, based on the assessed resource usage, the first memory region should have fewer memory elements than a total number of memory elements of the first memory region. In this example, it can then be further determined that the second memory region contracts the first memory region to have less data storage than the first memory region. Operations can then be scheduled (e.g., by a scheduler 1410) based on a contracted memory structure.

In an operation 1704, the method 1700 comprises, responsive to determining that the first memory region should have an allocation of more or less memory elements of the first memory region, allocating the second memory region in the access-controlled region of the memory of the operating system. For instance, allocating a second memory region in one or more embodiments includes determining a second pointer to the second memory region. Additionally, allocating a second memory region includes indexing a second set of memory elements in the second memory region relative to the second pointer and copying data from each occupied memory element of the first memory region to a memory element of the second memory region.

In one or more embodiments, the second set of memory elements of the second memory region, defining a size of the second memory region, comprises a different amount of memory elements than the first memory region. In one or more embodiments, a location of memory elements in the access-controlled region of the memory is separate from the location of memory elements of the first set of memory elements.

In one or more embodiments, a memory manager (e.g., memory manager 1442 of operating system layer 1406) allocates a first memory region (or first memory structure) in an access-controlled region of a memory of an operating system by determining a first pointer to the first memory region and indexing a first set of memory elements in the first memory region relative to the first pointer. The memory is shared by a plurality of threads to execute one or more operations according to a respective thread of the plurality of threads.

In one or more embodiments, the memory manager receives a first request for an operation on the first memory region from a first thread of the plurality of threads. The memory manager assesses a resource usage of the access-controlled region of a memory in view of the received request. The memory manager determines that, based on the assessed resource usage, the first memory region should have an allocation of more or less memory elements than a total number of memory elements of the first set of memory elements.

In one or more embodiments, the memory manager responsive to determining that the first memory region requires an allocation of more or less memory elements than the first set of memory elements, allocates a second memory region (or first memory structure) in the access-controlled region of a memory of the operating system by determining a second pointer to the second memory region and indexing a second set of memory elements in the second memory region relative to the second pointer. The second set of memory elements comprises a different amount of memory elements and a location of memory elements in the access-controlled region of the memory is separate from the location of memory elements of the first set of memory elements. The memory manager further copies data from each occupied memory element of the first memory region to a corresponding memory element of the second memory region to accommodate the operations of the first thread of the plurality of threads.

In one or more embodiments, the memory manager receives a second request for an operation on the first memory region from a second thread of the plurality of threads. During the copying of the data of the first memory region, the memory manager permits access to data of the first memory region in accordance with executing the second request.

In one or more embodiments, the memory manager determine whether the copying the data from each occupied memory element of the first memory region to the second memory region is complete and that there are no more threads of the plurality of threads accessing the first memory region.

In one or more embodiments, the memory manager responsive to determining that the copying data is complete and/or that there are no more threads accessing the first memory region prevents access to the first memory region for executing any operations according to the plurality of threads. Additionally or alternatively, the memory manger responsive to determining that the copying data is complete and/or that there are no more threads accessing the first memory region permits access to the second memory region for executing at least one operation according to a thread of the plurality of threads. Additionally or alternatively, the memory manger responsive to determining that the copying data is complete and/or that there are no more threads accessing the first memory region deallocates the first memory region such that the memory elements of the first memory region are no longer associated with storing data of the first memory region.

Figure 18:
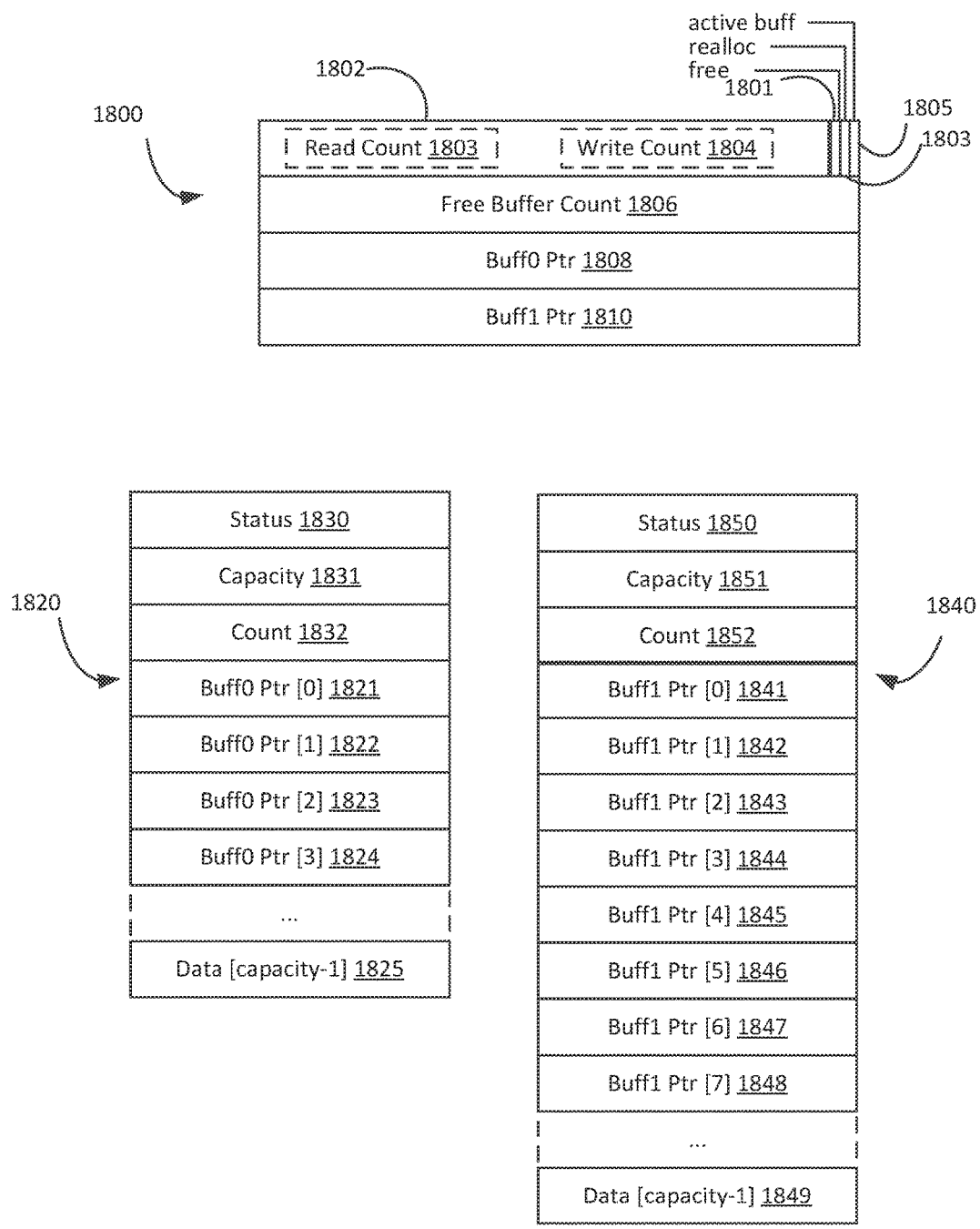
FIG. 18 illustrates examples of memory structures in at least one embodiment.

FIG. 18 shows an example memory structure 1800 in one or more embodiments for storing data for one or more entities (e.g., scheduler 1410) of a computing device to perform tasks related to a memory of the computing device (e.g., permit scheduling access to an access-controlled region of the memory and allocate and deallocate memory regions in the access-controlled region). The memory structure 1800 can be associated, for instance, with a memory region in the memory of a computing device (e.g., memory 1420 of computing device 1400).

Memory structure 1800 in one or more embodiments includes a visibility counter 1802 (e.g., a combination or sum of read count 1803 and write count 1804). The visibility counter indicates threads are accessing a first memory region associated with the memory structure 1800 (e.g., first memory region 1424). In other examples, the visibility counter could be a thread counter indicating each unique thread accessing the first memory region or a read counter for each read request received. A computing device, during use of the first memory region, can augment this visibility counter to determine how long to retain a first memory region. For instance, if data of a first memory region is copied to a second memory region, once there are no longer any threads access the first memory region, the first memory region can be deallocated from use for data storage.

In the case where the visibility counter comprises a read counter, the computing device can increment a read counter associated with the first memory region (e.g., read count 1803) for each read request received during and prior to the copying of data of the first memory region to the second memory region and decrement the read counter for each read request executed using the first memory region. In the case where the visibility counter is a thread counter, the computing device can increment the thread counter for each unique thread sending a read request during and prior to the copying of data of the first memory region to the second memory region; and decrement the thread counter for each thread that completes its operations involving the first memory region.

In one or more embodiments, the application layer of a computing device (e.g., a scheduler 1410) limits access to the access-controlled region to atomic operations (e.g., as shown in FIGS. 16A-16C). Thus, a thread counter and a sum of a read counter and a write counter would be equivalent. However, in other embodiments where the application did not limit access operations to atomic operations, a thread could sent multiple read and or write requests and a thread counter and a sum of a read counter and a write counter would not be equivalent, but would still indicate that threads are accessing a particular memory region.

In one or more embodiments, the memory structure 1800 includes a free buffer count 1806. In a case where a second memory region is created that comprises a copy of data of the first memory region, the first memory region can be described as transitioning from an active state to a quiescing state. In this quiescing state, the computing device does not permit scheduling of read or write requests received after the copying has been completed, but allows completion of already scheduled access to the first memory region. After completion of scheduled access, the first memory region can then move to a freed state in which the first memory region will no longer be used for data storage. In one or more embodiments, the visibility count 1802 is copied to a free buffer count 1806 for decrementing as threads complete their operations in the first memory region. Thus, the free buffer count 1806 can also be considered a form of a visibility counter. In one or more embodiments, the computing device checks, after the copying of the data of the first memory region, a visibility counter indicating whether threads are accessing the first memory region. When a visibility counter is zero (e.g. free buffer count 1806), the computing device deallocates the first memory region such that memory locations of the first memory region are no longer associated with storing data of the first memory region. In one or more embodiments, the computing device deregisters the first memory region from scheduling operations on the first memory region before deallocating the first memory region (e.g., responsive to data of the second memory region comprising a copy of data of the first memory region).

In one or more embodiments, the memory structure 1800 comprises one or more other data fields for implementation of one or more methods described herein. For instance, the memory structure 1800, includes a reallocate field 1803 to indicate another memory region (e.g., second memory region 1840) should be allocated. A free field 1801 can be used to indicate that a memory region associated with the memory structure 1800 should be freed (e.g., first memory region 1820). Alternatively or additionally, a null value can be set in a pointer field (e.g., Buff0 Ptr 1808) to a memory region to indicate that a memory region should be freed. An active buffer field 1805 can be used to indicate how many additional active buffers are present. The relative sizes of the fields are merely for example and should not be considered limiting. For instance, in the case where there is only one additional active buffer (e.g., second memory region 1840) only one bit is needed to indicate the active buffer. In other implementations or scenarios there may be a plurality of active or quiescing buffers and more bits may be needed to indicate these additional memory regions.

In one or more embodiments, the memory structure 1800 includes a write count 1804 indicating how many write requests are active in a memory region. In one or more embodiments, the computing device increments a write counter (e.g., write count 1804) associated with the first memory region for each write request received during and prior to the copying of data of the first memory region to the second memory region. This write counter is then copied to a write counter associated with the second memory region. For instance, the write counter is set to one when the second memory region is allocated and comprise the data of the first memory region.

Memory structure 1800, in one or more embodiments, comprises one or more pointers to memory regions in the access-controlled region (e.g., buffer pointer 1808 and buffer pointer 1810). For example, the memory regions could include a first array 1820 and a second array 1840. An array is a collection of data items that can be accessed by an index value (e.g., at memory elements with an index offset from a pointer). First array 1820 includes a plurality of memory elements for data storage (e.g., memory elements 1821-1825). Second array 1840 includes a plurality of memory elements for data storage (e.g., memory elements 1841-1849). A status field (e.g., status 1830 and 1850) can indicate whether a memory region is operating for data storage.

An array can grow to arbitrarily large (and shrink; this is a mirror of expand). However, in practice the capacity of the array is a set size (e.g., by a capacity 1831 for first array 1820 and capacity 1851 for second array 1840). An array is given merely as an example. The teachings described herein are applicable to other memory region structures or buffer structures not shown (e.g., a string, a hash table, an array of arrays, etc.). Thus, Buff0 Ptr 1808 and Buff1 Ptr 1810 would be used to point to these different data storage structures.

In one or more embodiments, the first array 1820 comprises a count 1832 for indicating how many memory elements are occupied in the first array. In other words, the count 1832 is a memory counter representing an amount of occupied memory elements in a first memory region.

In one or more embodiments, the computing device uses a memory counter (e.g., count 1832) to determine resource usage in memory. For instance, the computing device in one or more embodiments determines that the first memory region should have an allocation of more or less memory elements than a total number of memory elements of the first set of memory elements by comparing the memory counter to one or more thresholds.

In one or more embodiments, the memory counter is compared to a first threshold for determining whether a second memory region should be allocated that has a greater capacity for data storage or size that is larger than a first memory region. When the memory counter is greater than the first threshold, the computing device allocates the second memory region with a size that is larger than a size of the first memory region. For instance, the threshold in one or more embodiments is set lower than a total capacity of the first memory region to ensure that a second memory region to allow time for copying the data of the first memory region to the second memory region before the full capacity of the first memory region is exhausted.

In one or more embodiments, the memory counter is compared to a second threshold (e.g., a threshold different than the first threshold) for determining whether a second memory region should be allocated that has a smaller capacity for data storage or size that is smaller than a first memory region. When the memory counter is smaller than the first threshold, the computing device allocates the second memory region with a size that is smaller than a size of the first memory region. For instance, the threshold in one or more embodiments is set higher than zero to ensure that memory elements are not wasted in a larger first memory region.

Figure 19:
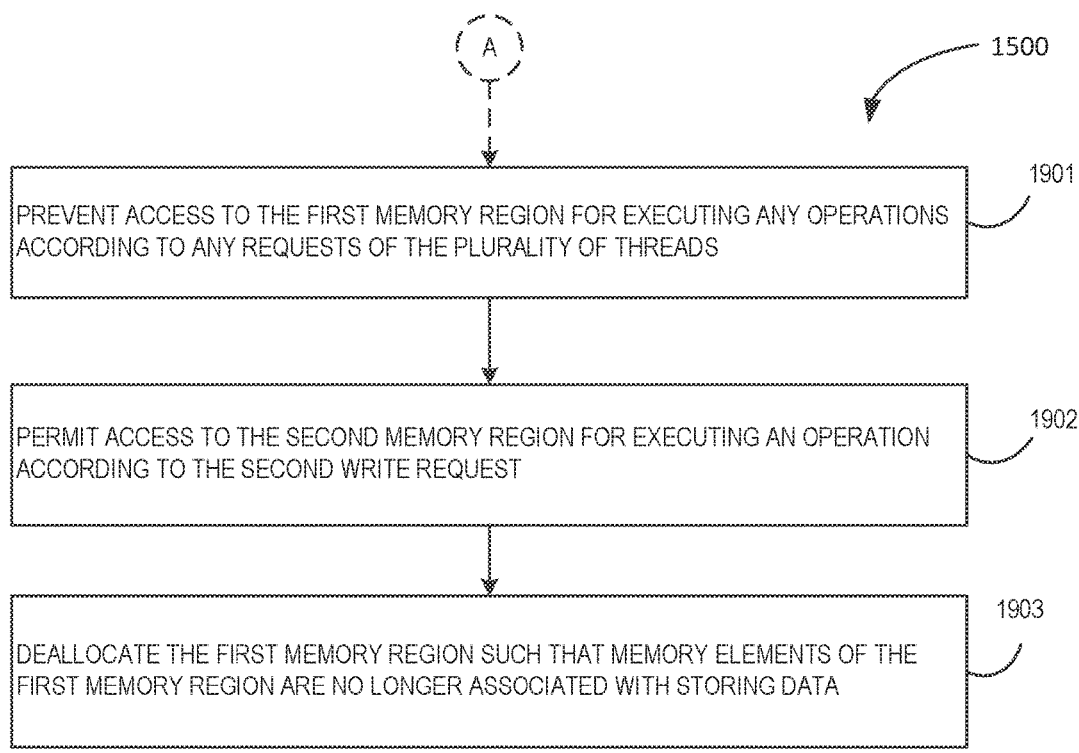
FIG. 19 illustrates an example of a flow diagram for permitting access to a memory of a computing device in at least one embodiment.

As shown in FIG. 18, the computing device in one or more embodiments includes one or more memory structures for managing memory in the access-controlled region. As shown in FIG. 19, the method 1500 includes one or more additional operations for managing memory (e.g., for deallocating a memory region) responsive to determining that data in each occupied memory element is copied from a first memory region to a second memory region and that there are no more threads accessing the first memory region.

In an operation 1901, the method 1500 includes preventing new access to the first memory region for executing any operations according to any requests of the plurality of threads.

In an operation 1902, the method 1500 includes permitting access to the second memory region for executing an operation according to write request received after the triggering of copying of the first memory region to the second memory region. As with the first memory region, concurrent access can be scheduled to the second memory region for read and write requests. For instance, a scheduler of a computing device can permit scheduling, by the scheduler, operations to write to the second memory region for a plurality of different write requests of write requests received after the copying is triggered and also permit scheduling operations to read from the second memory region for a plurality of read requests received after the copying is triggered.

In an operation 1903, the method 1500 includes deallocating the first memory region such that memory locations of the first memory region are no longer associated with storing data of the first memory region. This can be done in a number of ways. For example, the deallocating could involve setting a free indicator in a memory structure associated with the first memory region (e.g., free field 1801 in memory structure 1800) and/or by setting a null value in a pointer to the first memory region (e.g., Buff0Ptr 1808).

In one or more embodiments, methods described herein improve processing time for operations on an access-controlled region over traditional approaches to access an access-controlled region. Under a traditional approach an operating system layer would implement locks to protect access in a critical section such that only one thread and only one thread operation could occur in a critical section at a time. However, it also locks a memory region from access for any read requests.

In pseudo-code different locks for different read or write operations are expressed as follows:

Read(index)
   read Lock( )
   val=buffer[index]
   readUnlock( )
Update(index, val)
   writeLock( )
   buffer[index]=val
   writeUnlock( )
Append(val)
   writeLock( )
   if (count==capacity) {
   expandBuffer( )
   }
   buffer[count]=val
   count+=1
   writeUnlock( )

Test were performed on a Linux® machine and a Windows® machine to demonstrate the improved processing of method 1500 compared to this traditional approach (Read/Write Lock approach). Linux® invocations were run simultaneously on a same machine. Windows® invocations were run singularly on dedicated machine. An append test tested an append request or instruction. Execution of an append request is referred to as an iteration. An update test tested a read and update request or instruction. Each execution of operations for both the read and update is collectively referred to as an iteration. A read test tested a read of an entire array in the memory region of 100,000,000 data elements. Execution of a read request is referred to as an iteration. Each of the append, update and read tests was tested with various threads and various amounts of requests using the method 1500 and the read/write lock approach.

Table 1 shows the different tests performed by 10 threads performing collectively 10,000,000 iterations for each of the append, update, and read tests with results given in time units of seconds. As shown, there were significant time savings in processing that required writing to a memory (i.e., append and update requests). Method 1500 does not lock a memory from access during read operations when a write operation would prevent access under a traditional read/write lock approach.

TABLE 1

| Approach | Append | Update | Read |
| --- | --- | --- | --- |
| LINUX read/write lock | 113 s | 241 s | 180 s |
| LINUX Method 1500 | 7 s | 15 s | 74 s |
| WINDOWS read/write lock | 303 s | 298 s | 51 s |
| WINDOWS Method 1500 | 6 s | 10 s | 53 s |

Table 2 shows the different tests performed by 100 threads performing collectively 1,000,000 iterations for each of the append, update, and read tests with results given in time units of seconds. There were comparable time savings for append and update requests as shown in Table 1. As shown, there were significant time savings in read request processing when thread count increased. Method 1500 does not lock a memory from thread access during read operations which is different from a traditional read/write lock approach.

TABLE 2

| Approach | Append | Update | Read |
| --- | --- | --- | --- |
| LINUX read/write lock | 144 s | 164 s | 1797 s |
| LINUX Method 1500 | 9 s | 15 s | 659 s |
| WINDOWS read/write lock | 112 s | 201 s | 1577 s |
| WINDOWS Method 1500 | 7 s | 10 s | 527 s |

Table 3 shows the different tests performed by 1 thread performing collectively 100,000,000 iterations for each of the append, update, and read tests with results given in time units of seconds. As shown, there were not significant time savings because locking a thread from access to a memory region is less relevant when there is only one thread. However, there were some time savings from an operational level.

TABLE 3

| Approach | Append | Update | Read |
| --- | --- | --- | --- |
| LINUX read/write lock | 11 s | 11 s | 6 s |
| LINUX Method 1500 | 7 s | 7 s | 3 s |
| WINDOWS read/write lock | 78 s | 79 s | 1 s |
| WINDOWS Method 1500 | 5 s | 4 s | 1 s |

A particular buffer implementation used for testing as described the method 1500 will now be described in more detail in references to FIGS. 20-23 and should not be considered limiting. For instance, sample computer language is given, but one of ordinary skill in the art will appreciate other computer languages for implementing functions described herein. FIGS. 20A and 20B show example C delegate models for read and write operations to a memory region in the access-controlled region. FIG. 20A shows a read delegate model for a read operation. A read delegate is called after read visibility of the buffer is established. FIG. 20B shows a write delegate model for a write operation. A write delegate is called after write visibility of the buffer has been established. In one or more embodiments, a write delegate can unlock a read/write lock implemented using a traditional read/write lock approach. The scheduler does not block read or write access during execution by the write delegate. Serialization of data access is the responsibility of the underlying implementation. If a particular write request requires reallocation of a different memory, write processing can call a reallocate delegate not shown. As shown, the read and write operations also call a free delegate to release the buffer after a visibility count has been exhausted.

Other delegates can be defined. For instance, a reallocation delegate (not shown) can be used to allocate a new buffer and performing any initialization and copying before returning the new buffer.
Read Delegate: typedef int (*ABuffReadDelegate)(void*buff_p, void*gCntxt_p, void*iCntxt_p, void**data_p)
Write Delegate: typedef int (*ABuffWriteDelegate)(void*buff_p, void*gCntxt_p, void*iCntxt_p, void*data_p)
Reallocation Delegate: typedef int (*ABuffReallocDelegate)(void*buff_p, void*gCntxt_p, void*iCntxtp, void**newBuff_p)
Free Delegate: typedef int (*ABuffFreeDelegate)(void*buff_p, void*gCntxt_p)

Other code or routines can be defined to manage the memory region and establish read and write visibility for triggering the delegates defined above. A few such routines are defined below:
ABuffInit( )—Initializes a management operation as defined herein.
ABuffRead( )—Establishes read visibility and processes a read request against the buffer.
ABuffWrite( )—Establishes write visibility and processes a write request against the buffer
ABuffReset( )—Processes a Reallocation event with a NULL previous buffer to initialize the buffer.
ABuffDestroy( )—Cleans up a memory region.

Example computer code for the function ABuffInit( ) is described below:

```
Definition:
   ABuff structure definition
      typedef struct ABUFF_S{
         // Global Context
         void *global_p;
         // User Delegates
         ABuffReallocDelegate realloc;
         ABuffFreeDelegate free;
         // Internal / Owned by interface
         intptr_t oven;           // initialization guard
         intptr_t state;          // State of the system
         intptr_t freeCnt;        // free buffer visibility count
         void *buff0_p;           // Buffer 1 Pointer
         void *buff1_p;           // Buffer 2 Pointer
      }ABuff, *ABuffp;
   Function definition
      int ABuffInit(
         ABuffp abuff_p,          // Ptr to ABuffer struct to init
         void *initBuff_p);       // Initial buffer
   Parameters:
      abuff_p (input)
         A pointer to a global manager structure instance
      initBuff_p (input)
   Common Return Values:
         0 - buffer was correctly initialized
         !0 - Failure occurred
   Usage:
   #include "abuff.h"
   void init( ) {
      ABuff aBuff = { 0 };
      int rc = 0;
      // Setup Buffer: Zero'd above
      aBuff.global_p = array_p;
      aBuff.realloc = _abuffRealloc;
      aBuff.free = _abuffFree;
      rc = ABuffInit(&array_p->aBuff,
      new Buff);
      CHECK_RC(rc, FAIL);
   }
```

Example computer code for the function ABuffRead( ) is described below:

```
Definition:
   int ABuffRead(
      ABuffp abuff_p,  // Ptr to ABuffer struct to init
      ABuffReadDelegate readDelegate,  // Read Delegate
      void *context_p,  // Call context
      void **data_pp);  // Data returned
Parameters:
   abuff_p (input)
      A pointer to a global manager structure instance
   readDelegate (input)
      The user read function called after the read visibility has been
      established
   context_p (input)
      Invocation context passed to the read Delegate
   function data_pp (input)
      Value returned from the read Delegate function
Common Return Values:
   0 - buffer read operation was successful
   !0 - Failure occurred
Usage:
#include "abuff.h"
void init( ) {
   ABuff aBuff = { 0 };
   int rc = 0;
   // Setup Buffer: Zero'd above
   aBuff.global_p = array_p;
   aBuff.realloc = _abuffRealloc;
   aBuff.free = _abuffFree;
   rc = ABuffInit(&array_p->aBuff, newBuff);
   CHECK_RC(rc, FAIL);
}
// ArrayCapacity( ) - Return the capacity
static int _abuffCapacity(void *buff_p, void *gCntxt_p,
void *iCntxt_p, void **data_p)
{
   ArrayBuffp abuff_p = (ArrayBuffp)buff_p;
   intptr_t capacity = AtomicGet(&abuff_p->capacity);
   *data_p = (void*)capacity;
   return 0;
}
intptr_t ArrayCapacity(Arrayh array_h)
{
   Array_p array_p = (Array_p)array_h;
   intptr_t capacity = 0;
   intptr_t val = 0;
   int rc = 0;
   CHECK_NULL(array_p, FAIL);
   // Get Capacity
   rc = ABuffRead(&array_p->aBuff, _abuffCapacity, NULL, &val);
   CHECK_RC(rc, FAIL);
   capacity = (void*)val;
DONE:
   return capacity;
```

Example computer code for the function ABuffWrite( ) is described below:

```
Definition:
    int ABuffWrite(
        ABuffp abuff_p,  // Ptr to Buffer struct to init
        ABuffWriteDelegate writeDelegate, // Write Delegate
        void *context_p, // Call context
        void *data_p); // Data to write
Parameters:
    abuff_p (input)
        A pointer to a global manager structure
        instance writeDelegate (input)
        The user write function called after the write visibility has been
        established
        returns ABUFF_REALLOC when reallocation processing is
        required
    context_p (input)
        Invocation context passed to the writeDelegate
        function data_p (input)
        Value passed to the writeDelegate function
Common Return Values:
    0 - buffer write operation was successful
    !0 - Failure occurred
Usage:
#include "abuff.h"
void init( ) {
    ABuff aBuff = { 0 };
    int rc = 0;
    // Setup Buffer: Zero'd above
    aBuff.global_p = array_p;
    aBuff.realloc = _abuffRealloc;
    aBuff.free = _abuffFree;
    rc = ABuffInit(&array_p->aBuff, newBuff);
    CHECK_RC(rc, FAIL);
}
// ArrayUpdateValue( ) - a[index] = val
// returns previous value of a[index]
static int _abuffUpdate(void *buff_p, void *gCntxt_p,
void *iCntxt_p, void **data_p)
{
    ArrayBuffp abuff_p = (ArrayBuffp)buff_p;
    intptr_t index = (intptr_t)iCntxt_p;
    intptr_t newVal = (intptr_t)*data_p, oldVal = 0;
    int rc = 0;
    do {
        // Index check
        intptr_t count = (intptr_t)AtomicGet(&abuff_p->count);
        if (index >=count) {
            goto FAIL_ARG;
        }
        // Get the value at the subscript / swap
        oldVal = AtomicGet(&abuff_p->data[index]);
    }while (!AtomicSet(&abuff_p->data[index], oldVal, newVal));
DONE:
    if (0 == rc) {
        *data_p = (void*)oldVal;
    }
    return rc;
FAIL:
    if (0 ==rc) {
        rc = GENERIC;
    }
    oldVal = 0;
    goto DONE;
FAIL_ARG:
    rc = ARGERROR;
    goto FAIL;
}
void *ArrayUpdateValue(Arrayh array_h, intptr_t index,
void *val, int *rc_p)
{
    Array_p array_p = (Array_p)array_h;
    int rc = 0;
    CHECK_NULL(array_p, FAIL_ARG);
    // Get the value at the array subscript
    rc = ABuffRead(&array_p->aBuff, _abuffUpdate,
        (void*)index, &val);
    CHECK_RC(rc, FAIL);
DONE:
    if (rc_p) {
        *rc_p = rc;
    }
    return val;
FAIL:
    if (0 == rc) {
        rc = GENERIC;
    }
    val = NULL;
    goto DONE;
FAIL_ARG:
    rc = ARGERROR;
    goto FAIL;
}
```

Example computer code for the function ABuffReset( ) is described below:

```
Definition:
    int ABuffReset(
        ABuffp abuff_p,          // Ptr to Buffer struct to init
        void *context p); // Call context
Parameters:
    abuff_p (input)
        A pointer to a global manager structure instance
    context_p (input)
        Invocation context passed to the writeDelegate function
Common Return Values:
    0 - buffer reset operation was successful
    !0 - Failure occurred
Usage:
#include "abuff.h"
void init( ) {
    ABuff aBuff = { 0 };
    int rc = 0;
    // Setup Buffer: Zero'd above
    aBuff.global_p = array_p;
    aBuff.realloc = _abuffRealloc;
    aBuff.free = _abuffFree;
    rc = ABuffInit(&array_p->aBuff, newBuff);
    CHECK_RC(rc, FAIL);
}
// ArrayRemoveAllKeep( ) - remove all elements
// keepCapacity - Keep the capacity
int ArrayRemoveAllKeep(Arrayh array_h, Boolean keepCapacity)
{
    Array_p array_p = (Array_p)array_h;
    intptr_t capacity;
    int rc = 0;
    CHECK_NULL(array_p, FAIL_ARG);
    // Acquire the capacity
    capacity = ((keepCapacity) ? ArrayCapacity(array_h) : 0);
    // Reset the buffer
    rc = ABuffReset(&array_p->aBuff, (void*)capacity);
    CHECK_RC(rc, FAIL);
DONE:
    return rc; FAIL:
    if (0 == rc) {
        rc = GENERIC;
    }
    goto DONE;
FAIL_ARG:
    rc = ARGERROR;
    goto FAIL;
}
```

Example computer code for the function ABuffDestroy( ) is described below:

```
Definition:
    int ABuffDestroy(
        ABuffp abuff_p);        // Ptr to Buffer struct to init
    Parameters:
        abuff_p (input)
            A pointer to a global manager structure instance
    Common Return Values:
        0 - buffer destroy operation was successful
        !0 - Failure occurred
    Usage:
    #include "abuff.h"
        void init( ) {
        ABuff aBuff = { 0 };
        int rc = 0;
        // Setup Buffer: Zero'd above
        aBuff.global_p = array_p;
        aBuff.realloc = _abuffRealloc;
        aBuff.free = _abuffFree;
        rc = ABuffInit(&array_p->aBuff, newBuff);
        CHECK_RC(rc, FAIL);
    }
    // ArrayDestroy( ) - Destroy the array
    int ArrayDestroy(Arrayh array_h)
    {
        Array_p array_p = (Array_p)array_h;
        int rc = 0, tmprc;
        CHECK_NULL(array_p, DONE);
        if (array_p->pool_h) {
            tmprc = ABuffDestroy(&array_p->aBuff);
            CHECK_SWAP_RC(rc, tmprc);
            tmprc = (array_p);
            CHECK_SWAP_RC(rc, tmprc);
        }
    DONE:
        return rc;
    }
```

Figures 21A, 21B:
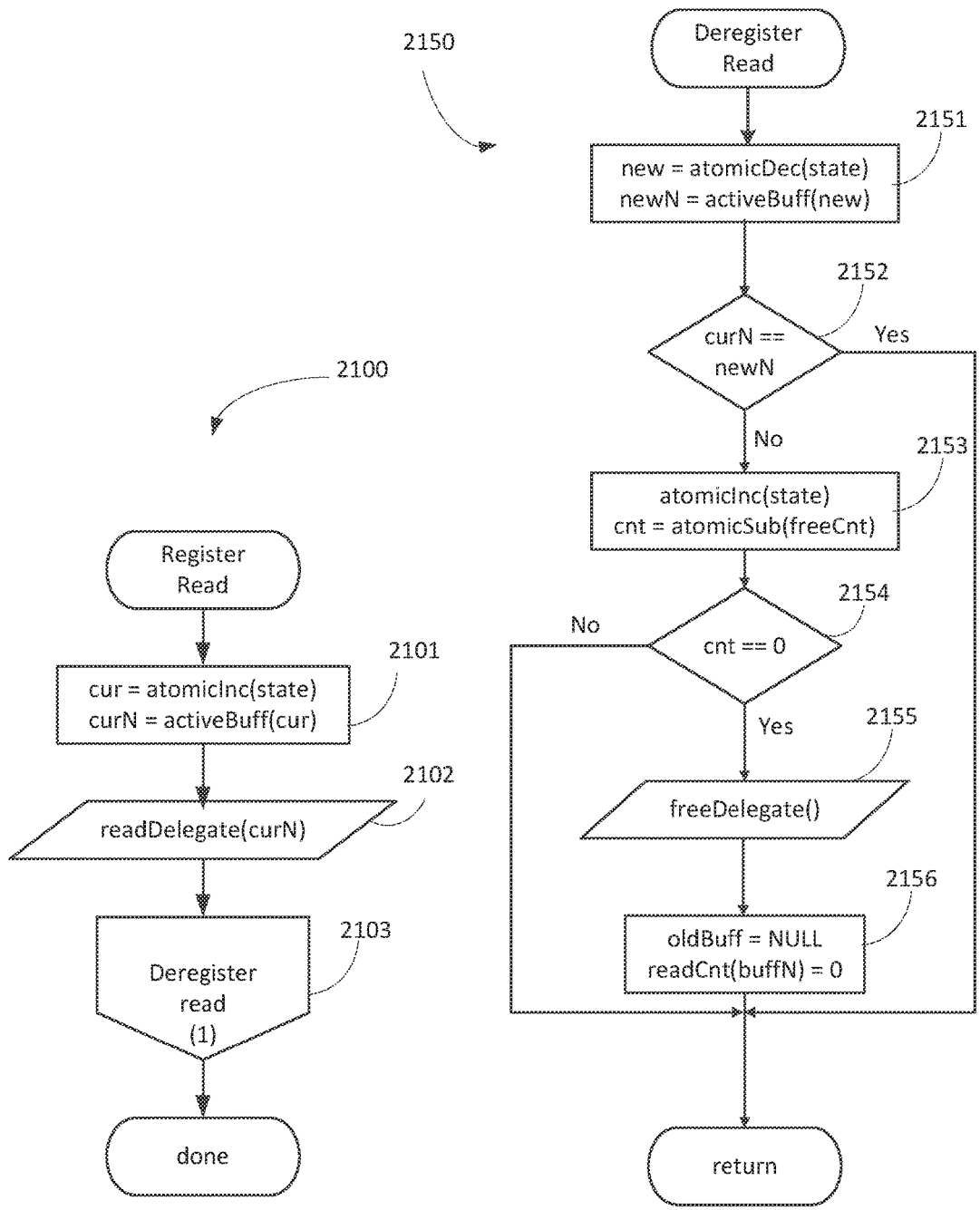
FIG. 21A illustrates an example flow diagram to register a read request for a buffer implementation in at least one embodiment.
FIG. 21B illustrates an example flow diagram to deregister a read request for a buffer implementation in at least one embodiment.

FIG. 21A illustrates a flow diagram 2100 to register a read request for a buffer implementation in at least one embodiment. In this example, atomic operations are implemented In operation 2101, initialization operations as described herein are performed to establish the active buffer and read visibility for the active buffer is incremented.

In an operation 2102, a read delegate is called for the current active buffer as described herein.

In an operation 2103, an operation to deregister the read is called and shown in FIG. 21B.

FIG. 21B illustrates a flow diagram 2150 to deregister a read request for a buffer implementation in at least one embodiment.

In an operation 2151, a read count is deregistered

In an operation 2152, it is determined whether there is a new active buffer replacing a current buffer. In particular, it is determined whether new active buffer ("new") is the same as the old active buffer ("cur"). If it is same, the method ends. If it is not the same, in an operation 2153, a visibility count (cnt) for a visibility counter as described herein is determined. If count is not equal to zero, the method ends because it means there are still operations being performed on the old buffer (i.e. the buffer that proceeded the new active buffer).

If the visibility count is equal to zero, it means there are no longer threads accessing the old buffer. In an operation 2155, a freeDelegate is called as described herein to release the old buffer. In an operation 2156, a pointer to the old buffer is set to a null value, and a read counter for the new buffer (buffN) is set to zero.

Figure 22:
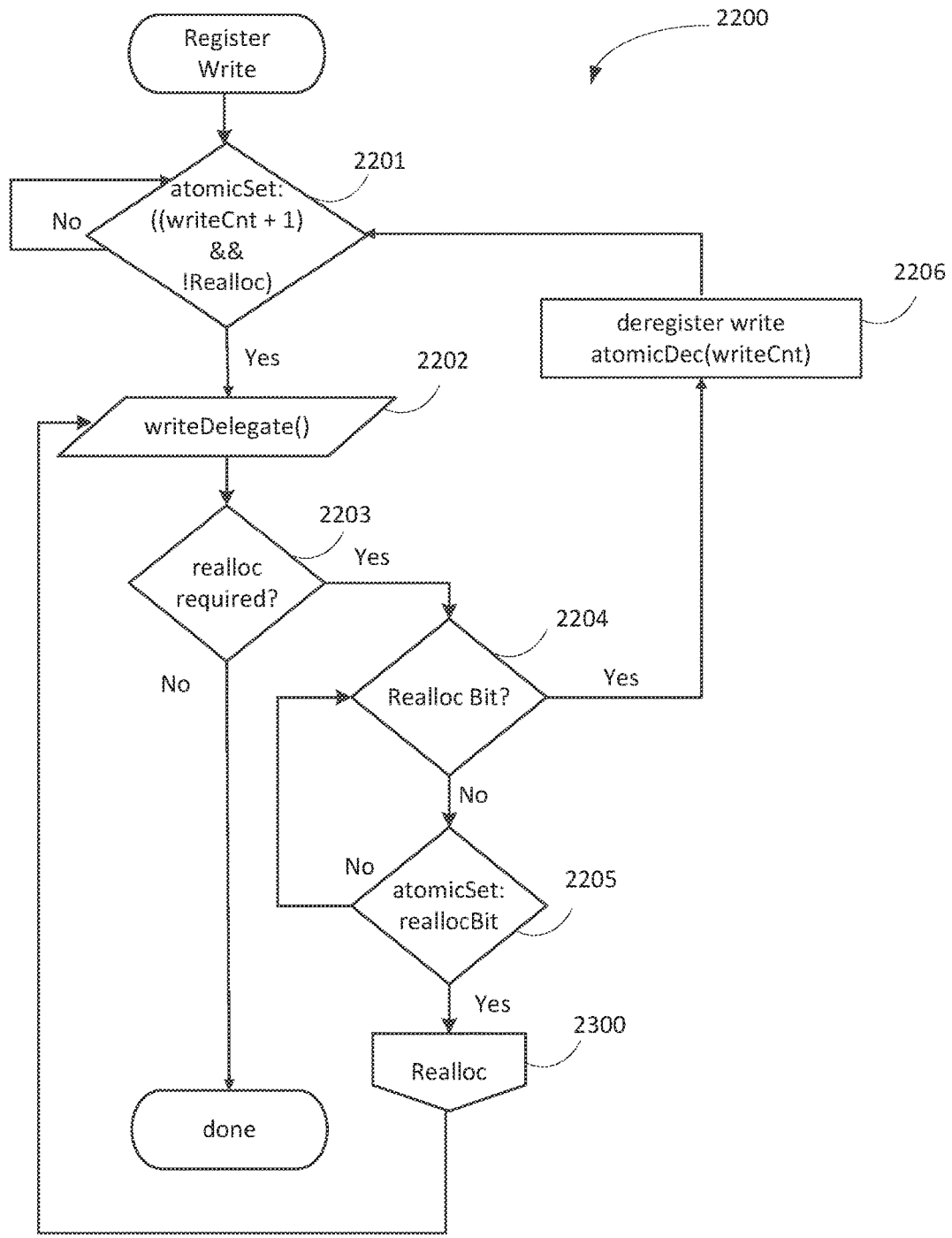
FIG. 22 illustrate an example flow diagram to register a write request for a buffer implementation in at least one embodiment.

FIG. 22 illustrates a flow diagram 2200 to register a write request for a buffer implementation in at least one embodiment.

In an operation 2201, it is determined whether the write counter (writeCnt) indicates a write operation can proceed (e.g., whether both of conditions writeCnt+1 and !Realloc are met).

If yes, then a writeDelegate is called as described herein in an operation 2202. If no, then any write request is held at operation 2201 until the writer counter indicates a write operation should be performed.

After calling the writeDelegate, it is determined in operation 2203 whether another memory region should be allocated. If no, the method 2200 ends. If yes, in an operation 2204, it is checked whether an indicator in the reallocate field (e.g., a reallocBit) is set to a certain value to indicate another thread is in allocation processing of another memory region as described herein. If yes, the write is deregistered in an operation 2206. If is determined in an operation 2205 whether to set the reallocBit. If initially the determination is no, the method 2200 loops until it is determined to set the reallocBit. When it is determined to set the indicator in the reallocate field, the method proceeds to a method 2300 for allocating a new buffer.

Figure 23:
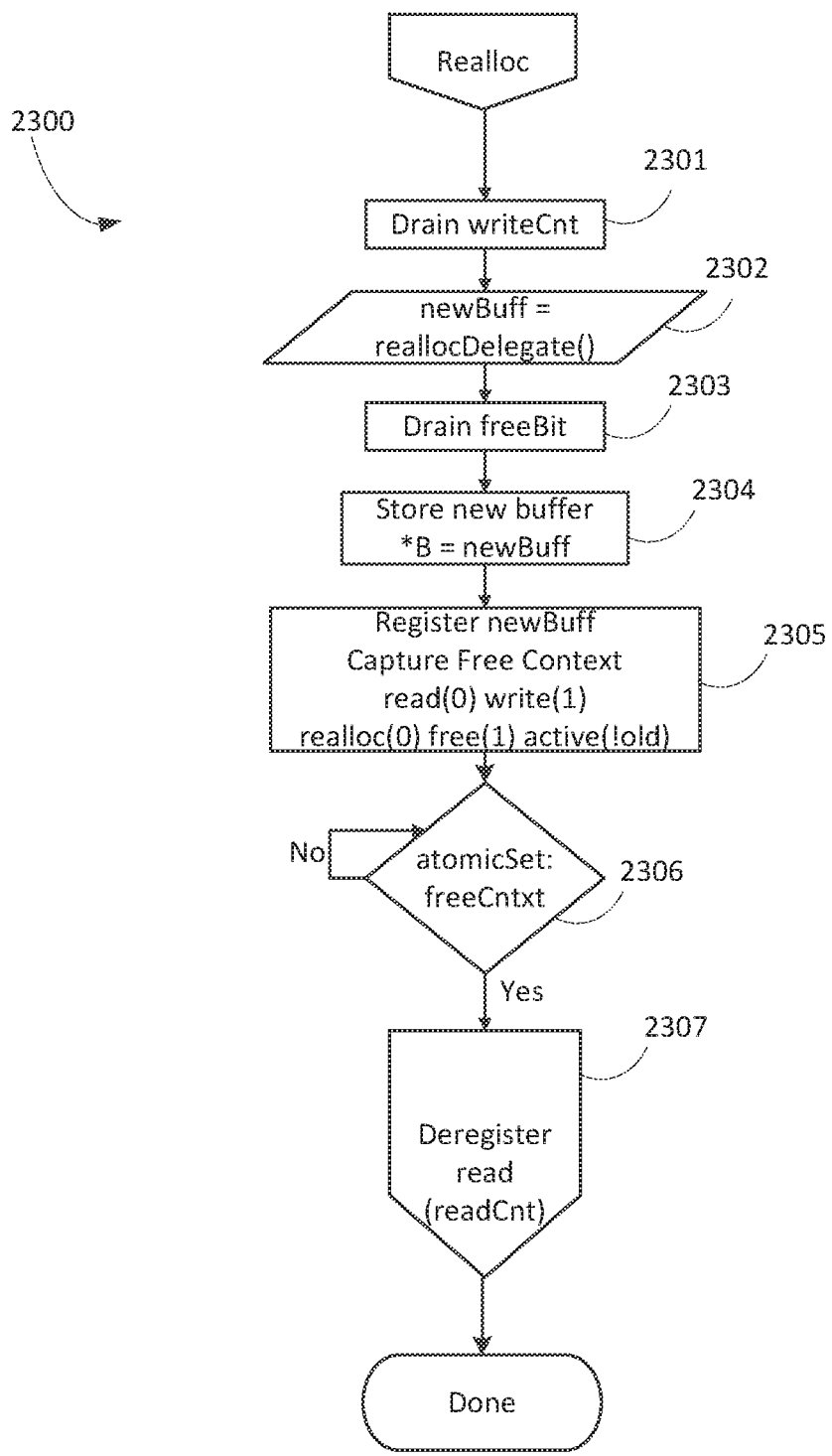
FIG. 23 illustrate an example flow diagram to reallocate a buffer in at least one embodiment.

FIG. 23 illustrates a flow diagram 2300 to register a write request for a buffer implementation in at least one embodiment involving reallocating a new buffer. The processing the reallocating a buffer involves draining a write visibility count.

In an operation 2301, a writecounter (writeCnt) for an old buffer is drained, meaning that all writes that can be performed on the old buffer are done.

In an operation 2302, a new buffer is created by calling a reallocation delegate as described herein.

A freeBit is an indication that the old buffer is still being processed. It could be the case that there are multiple buffers in which more than one bit is needed. For instance, a first buffer still has active read operations and is in a quiescing state, a second buffer is full, is in a write thread reallocate processing, and still accepting read requests, and a third buffer has a copy of the first buffer. In an operation 2303, freeBit is drained to indicate the old buffer is ready to be released from data storage as described herein.

In an operation 2304, the new buffer is stored.

In an operation 2305, the new buffer is registered by associating particular data values in a memory structure associated with the new buffer as described herein. For instance, a read counter for new buffer is set to zero, a write counter is set to 1, a reallocatebit is set to zero, a free bit is set to 1.

In an operation 2306, it is determined whether the context for freeing the old buffer is complete.

In an operation 2307, operations described in flow diagram 2150 in FIG. 21B are performed before the method 2300 is complete.

Implementing one or more methods, flow diagrams, apparatuses, and systems as described herein, decreases processing time for traditional methods to implement multi-thread access to an access-controlled region of a computing device.

What is claimed is:

1. A computer-program product tangibly embodied in a non-transitory machine-readable storage medium, the computer-program product including instructions operable to cause a computing device to:

receive, at a scheduler of the computing device, a first write request from a first thread of a plurality of threads, wherein:

the scheduler schedules access for the plurality of threads across a boundary of an access-controlled region in a memory of the computing device;

the access-controlled region comprises a first memory region;

each of the plurality of threads indicates an operation on the first memory region; and the first write request indicates that a first operation associated with the first thread comprises an operation to add, remove, or update data of a memory element of the first memory region;

determine that a second memory region in the access-controlled region is allocated for storing data copied from the first memory region;

during copying, to the second memory region, of the data copied from the first memory region:

permit scheduling, by the scheduler, an operation to read from the first memory region for all read requests from the plurality of threads during the copying; and deny scheduling, by the scheduler, an operation to write to the first memory region for all subsequent write requests from the plurality of threads during the copying; and when data of the second memory region comprises a copy of the data copied from the first memory region, permit scheduling, by the scheduler, an operation to write to the second memory region for a second write request of the subsequent write requests.

2. The computer-program product of claim 1, wherein the instructions are operable to cause the computing device, during the copying of the data copied from the first memory region, to block access from the plurality of threads to the first memory region for write requests without blocking access for read requests from the plurality of threads.

3. The computer-program product of claim 1, wherein the instructions are operable to cause the computing device, when the second memory region comprises a copy of the data copied from the first memory region, to schedule concurrent access for the plurality of threads to the access-controlled region by:

permitting scheduling, by the scheduler, operations to write to the second memory region for a plurality of different write request of the subsequent write requests; and permitting scheduling, by the scheduler, operations to read from the second memory region for a plurality of read requests received from the plurality of threads.

4. The computer-program product of claim 1, wherein the instructions are operable to cause the computing device to represent only one represented memory structure to each of the plurality of threads during a time when both the first memory region and the second memory region comprises data copied from the first memory region; and wherein the all subsequent write requests comprise:

an update request to change data of a given memory element in the represented memory structure;

an insert request to insert data to a memory element in the represented memory structure; or a delete request to remove data from an occupied memory element in the represented memory structure.

5. The computer-program product of claim 1, wherein the instructions are operable to cause the computing device to deny scheduling an operation to write to the first memory region by implementing a spin lock towards a second thread of the plurality of threads different from the first thread, wherein the second thread waits until the first thread completes its operations involving the second memory region before the second thread is scheduled for access to the second memory region according to the spin lock.

6. The computer-program product of claim 1, wherein the instructions are operable to cause the computing device to:

assess a resource usage of the access-controlled region of the memory in view of the received first write request;

determine that, based on the assessed resource usage, the first memory region should have an allocation of more or less memory elements than a total number of memory elements of the first memory region; and responsive to determining that the first memory region should have an allocation of more or less memory elements of the first memory region, allocate the second memory region in the access-controlled region of a memory.

7. The computer-program product of claim 6, wherein the instructions are operable to cause the computing device to:

determine, based on the assessed resource usage, the first memory region should have more memory elements than a total number of memory elements of the first memory region;

determine that the second memory region expands the first memory region to have more data storage than the first memory region; and schedule operations, by the scheduler, based on an expanded memory region.

8. The computer-program product of claim 6, wherein the instructions are operable to cause the computing device to:

determine, based on the assessed resource usage, the first memory region should have fewer memory elements than a total number of memory elements of the first memory region;

determine that the second memory region contracts the first memory region to have less data storage than the first memory region; and schedule, by the scheduler, operations based on a contracted memory region.

9. The computer-program product of claim 6, wherein the first memory region is a first buffer of a plurality of buffers, each of the plurality of buffers with respective sets of occupied memory elements in the access-controlled region;

wherein the plurality of buffers is controlled by a memory management system of an operating system of the computing device; and wherein the instructions are operable to:

assess a resource usage of the access-controlled region by accessing the resource usage of the plurality of buffers; and determine that, based on the assessed resource usage of the plurality of buffers, the first memory region should have an allocation of more or less memory elements than a total number of memory elements of the first memory region.

10. The computer-program product of claim 1, wherein the instructions are operable to cause the computing device to:

allocate the first memory region in the access-controlled region by:

determining a first pointer to the first memory region; and indexing a first set of memory elements in the first memory region relative to the first pointer, wherein the first set of memory elements defines a first size of the first memory region;

allocate the second memory region in the access-controlled region by:

determining a second pointer to the second memory region;

indexing a second set of memory elements in the second memory region relative to the second pointer, wherein the second set of memory elements, defining a second size of the second memory region, comprises a different amount of memory elements and a location of memory elements in the access-controlled region of the memory separate from the location of memory elements of the first set of memory elements; and copying data from each occupied memory element of the first memory region to a memory element of the second memory region;

augment a memory counter representing an amount of occupied memory elements in the first set of memory elements; and determine that the first memory region should have an allocation of more or less memory elements than a total number of memory elements of the first set of memory elements by comparing the memory counter to a threshold.

11. The computer-program product of claim 10, wherein the instructions are operable to cause the computing device to:

responsive to determining that the first memory region should have an allocation of more or less memory elements than the total number of memory elements of the first set of memory elements, deallocate the first memory region by setting an indicator in a data structure comprising a pointer to the first memory region;

wherein when the memory counter is greater than a first threshold, allocate the second memory region with a size that is larger than a size of the first memory region; and wherein when the memory counter is smaller than a second threshold, allocate the second memory region with a size that is smaller than a size of the first memory region.

12. The computer-program product of claim 1, wherein the instructions are operable to cause the computing device to:

determine that the first memory region can be freed from storing data copied to the second memory region by:
determining each occupied memory element of the first memory region is copied to a memory element of the second memory region; and
determining that there are no more threads of the plurality of threads accessing the first memory region; and responsive to determining that the copying data is complete:
prevent access to the first memory region for executing any operations according to any requests of the plurality of threads;
permit access to the second memory region for executing an operation according to the second write request; and
deallocate the first memory region such that memory locations of the first memory region are no longer associated with storing data of the first memory region.

13. The computer-program product of claim 1, wherein the instructions are operable to cause the computing device to retain the first memory region based on adjusting a visibility counter indicating that threads are accessing the first memory region.

14. The computer-program product of claim 13, wherein the visibility counter comprises a read counter, and the instructions are operable to cause the computing device to:
increment the read counter associated with the first memory region for each read request received during and prior to the copying of data copied from the first memory region; and
decrement the read counter for each read request executed using the first memory region.

15. The computer-program product of claim 13, wherein the visibility counter comprises a thread counter associated with the first memory region, and the instructions are operable to cause the computing device to:
increment the thread counter for each unique thread sending a read request during and prior to the copying data copied from the first memory region; and
decrement the thread counter for each thread that completes its operations involving the first memory region.

16. The computer-program product of claim 1, wherein the visibility counter comprises a write counter associated with the first memory region, and the instructions are operable to cause the computing device to:
increment a write counter associated with the first memory region for each write request received during and prior to the copying of data of the first memory region to the second memory region, and
decrement the write counter for each write request executed using the first memory region.

17. The computer-program product of claim 1, wherein the instructions are operable to cause the computing device to:
check, after the copying of the data copied from the first memory region, a visibility counter indicating whether threads are accessing the first memory region,
when the visibility counter is zero, deallocate the first memory region such that memory locations of the first memory region are no longer associated with storing data of the first memory region.

18. The computer-program product of claim 1, wherein the instructions are operable to cause the scheduler to:
schedule the operation to read from the first memory region using a first pointer to a first array, a first string, or a first hash table of the first memory region; and
schedule the operation to write to the second memory region for the second write request using a second pointer to a second array, a second string, or a second hash table of the second memory region, wherein the second pointer is different than the first pointer.

19. A computer-implemented method, the method comprising:
receiving, at a scheduler of the computing device, a first write request from a first thread of a plurality of threads, wherein:
the scheduler schedules access for the plurality of threads across a boundary of an access-controlled region in a memory of the computing device;
the access-controlled region comprises a first memory region;
each of the plurality of threads indicates an operation on the first memory region; and
the first write request indicates that a first operation associated with the first thread comprises an operation to add, remove, or update data of a memory element of the first memory region;
determining that a second memory region in the access-controlled region is allocated for storing data copied from the first memory region;

during copying, to the second memory region, of the data copied from the first memory region:
permitting scheduling, by the scheduler, an operation to read from the first memory region for all read requests from the plurality of threads during the copying; and
denying scheduling, by the scheduler, an operation to write to the first memory region for all subsequent write requests from the plurality of threads during the copying; and
when data of the second memory region comprises a copy of the data copied from the first memory region, permitting scheduling, by the scheduler, an operation to write to the second memory region for a second write request of the subsequent write requests.

20. The computer-implemented method of claim 19, further comprising during the copying the data copied from the first memory region, blocking access from the plurality of threads to the first memory region for write requests without blocking access for read requests from the plurality of threads.

21. The computer-implemented method of claim 19, further comprising, when the second memory region comprises a copy of the data copied from the first memory region, scheduling concurrent access for the plurality of threads to the access-controlled region by:
permitting scheduling, by the scheduler, operations to write to the second memory region for a plurality of different write request of the subsequent write requests; and
permitting scheduling, by the scheduler, operations to read from the second memory region for a plurality of read requests received from the plurality of threads.

22. The computer-implemented method of claim 19,
further comprising representing only one represented memory structure to each of the plurality of threads during a time when both the first memory region and the second memory region comprises data copied from the first memory region; and
wherein the all subsequent write requests comprise:
an update request to change data of a given memory element in the represented memory structure;
an insert request to insert data to a memory element in the represented memory structure; or
a delete request to remove data from an occupied memory element in the represented memory structure.

23. The computer-implemented method of claim 19, wherein the denying scheduling an operation to write to the first memory region comprises implementing a spin lock toward a second thread of the plurality of threads different from the first thread, wherein the second thread waits until the first thread completes its operations involving the second memory region before the second thread is scheduled for access to the second memory region according to the spin lock.

24. The computer-implemented method of claim 19, further comprising:
assessing a resource usage of the access-controlled region of the memory in view of the received first write request;
determining that, based on the assessed resource usage, the first memory region should have an allocation of more or less memory elements than a total number of memory elements of the first memory region; and
responsive to determining that the first memory region should have an allocation of more or less memory elements of the first memory region, allocating the second memory region in the access-controlled region of a memory.

25. The computer-implemented method of claim 24,
wherein the determining that the first memory region should have an allocation of more or less memory elements comprises determining, based on the assessed resource usage, the first memory region should have more memory elements than a total number of memory elements of the first memory region; and
wherein the method further comprises:
determining that the second memory region expands the first memory region to have more indexed memory locations for data storage than the first memory region; and
scheduling operations by the scheduler based on an expanded memory region.

26. The computer-implemented computer-program product of claim 24,
wherein the determining that the first memory region should have an allocation of more or less memory elements comprises determining, based on the assessed resource usage, the first memory region should have fewer memory elements than a total number of memory elements of the first memory region; and
wherein the method further comprises:
determining that the second memory region contracts the first memory region to have less indexed memory locations for data storage than the first memory region; and
scheduling operations based on a contracted memory region.

27. The computer-implemented method of claim 19, further comprising:
determining that copying data of the first memory region to the second memory region is complete by:
determining each occupied memory element of the first memory region is copied to a corresponding memory element of the second memory region; and
determining that there are no more threads of the plurality of threads accessing the first memory region; and
responsive to determining that the copying data is complete:
preventing new access to the first memory region for executing any operations according to any requests of the plurality of threads;
permitting access to the second memory region for executing an operation according to the second write request; and
deallocating the first memory region such that memory locations of the first memory region are no longer associated with storing data of the first memory region.

28. The computer-implemented method of claim 19, further comprising retaining the first memory region based on adjusting a visibility counter indicating that threads are accessing the first memory region.

29. The computer-implemented method of claim 19, further comprising:
checking, after the copying of the data copied from the first memory region, a visibility counter indicating whether threads are accessing the first memory region, when the visibility counter is zero, deallocate the first memory region such that memory locations of the first memory region are no longer associated with storing data of the first memory region.

30. A computing device comprising processor and memory, the memory containing instructions executable by the processor wherein the computing device is configured to:

receive, at a scheduler of the computing device, a first write request from a first thread of a plurality of threads, wherein:

the scheduler schedules access for the plurality of threads across a boundary of an access-controlled region in a memory of the computing device;

the access-controlled region comprises a first memory region;

each of the plurality of threads indicates an operation on the first memory region; and the first write request indicates that a first operation associated with the first thread comprises an operation to add, remove, or update data of a memory element of the first memory region;

determine that a second memory region in the access-controlled region is allocated for storing data copied from the first memory region;

during copying, to the second memory region, of the data copied from the first memory region:

permit scheduling, by the scheduler, an operation to read from the first memory region for all read requests from the plurality of threads during the copying; and deny scheduling, by the scheduler, an operation to write to the first memory region for all subsequent write requests from the plurality of threads during the copying; and when data of the second memory region comprises a copy of the data copied from the first memory region, permit scheduling, by the scheduler, an operation to write to the second memory region for a second write request of the subsequent write requests.

* * * * *